United States Patent
Aizawa et al.

(10) Patent No.: US 10,361,603 B2
(45) Date of Patent: Jul. 23, 2019

(54) MECHANICALLY AND ELECTRICALLY INTEGRATED DRIVING APPARATUS AND MANUFACTURING METHOD THEREFOR

(71) Applicant: MITSUBISHI ELECTRIC CORPORATION, Chiyoda-ku (JP)

(72) Inventors: Junichi Aizawa, Chiyoda-ku (JP); Yoshihiro Miyama, Chiyoda-ku (JP); Akihiro Daikoku, Chiyoda-ku (JP); Norihiro Watanabe, Chiyoda-ku (JP); Hideaki Arita, Chiyoda-ku (JP); Shota Hanioka, Chiyoda-ku (JP); Shigetoshi Ipposhi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 411 days.

(21) Appl. No.: 15/034,121

(22) PCT Filed: Oct. 20, 2014

(86) PCT No.: PCT/JP2014/077799
§ 371 (c)(1),
(2) Date: May 3, 2016

(87) PCT Pub. No.: WO2015/093138
PCT Pub. Date: Jun. 25, 2015

(65) Prior Publication Data
US 2016/0276895 A1    Sep. 22, 2016

(30) Foreign Application Priority Data

Dec. 16, 2013 (JP) ................... 2013-258807

(51) Int. Cl.
*H02K 11/33* (2016.01)
*H02K 15/14* (2006.01)
(Continued)

(52) U.S. Cl.
CPC ............. *H02K 5/20* (2013.01); *H02K 3/46* (2013.01); *H02K 3/522* (2013.01); *H02K 5/08* (2013.01);
(Continued)

(58) Field of Classification Search
CPC ........ H02K 11/33; H02K 15/14; H02K 15/16; H02K 3/46; H02K 3/522; H02K 5/08;
(Continued)

(56) References Cited

U.S. PATENT DOCUMENTS

2004/0226761 A1* 11/2004 Takenaka ............... B60K 6/405
180/65.1
2005/0269895 A1* 12/2005 Innami ................. B62D 5/0403
310/429
(Continued)

FOREIGN PATENT DOCUMENTS

CN    102570694 A    7/2012
JP    60-152247 A    8/1985
(Continued)

OTHER PUBLICATIONS

English translation for JP 2013172564; Watanabe et al.; Sep. 2013.*
(Continued)

*Primary Examiner* — Bernard Rojas
*Assistant Examiner* — Ahmed Elnakib
(74) *Attorney, Agent, or Firm* — Oblon, McClelland, Maier & Neustadt, L.L.P.

(57) ABSTRACT

In a mechanically and electrically integrated driving apparatus, a common coolant flow channel for cooling a motor unit and an inverter unit is disposed inside a wall portion of a frame unit. Power modules are placed in close contact with an inner wall surface of the frame unit. A bracket that is separate from the frame unit is fitted into the frame unit. A space inside the frame unit is divided by the bracket into: a
(Continued)

space in which the motor unit is housed; and a space in which the inverter unit is housed.

16 Claims, 19 Drawing Sheets

(51) Int. Cl.
| | |
|---|---|
| H02K 5/08 | (2006.01) |
| H02K 5/16 | (2006.01) |
| H02K 5/18 | (2006.01) |
| H02K 5/20 | (2006.01) |
| H02K 5/22 | (2006.01) |
| H02K 7/08 | (2006.01) |
| H02K 9/19 | (2006.01) |
| H02K 15/16 | (2006.01) |
| H02K 3/46 | (2006.01) |
| H02K 3/52 | (2006.01) |

(52) U.S. Cl.
CPC ............... *H02K 5/16* (2013.01); *H02K 5/18* (2013.01); *H02K 5/225* (2013.01); *H02K 7/08* (2013.01); *H02K 9/19* (2013.01); *H02K 11/33* (2016.01); *H02K 15/14* (2013.01); *H02K 15/16* (2013.01); *H02K 2203/09* (2013.01)

(58) Field of Classification Search
CPC .. H02K 5/16; H02K 5/18; H02K 5/20; H02K 5/225; H02K 7/08; H02K 9/19; H02K 2203/09; H02K 11/05; H02K 11/20; H02K 5/15
USPC ........... 310/52, 54, 71, 89, 58, 59, 43, 68 A, 310/68 D, 400–418
See application file for complete search history.

(56) References Cited

U.S. PATENT DOCUMENTS

| | | | | |
|---|---|---|---|---|
| 2007/0013241 | A1* | 1/2007 | Schiferl | H02K 1/32 310/54 |
| 2007/0278876 | A1* | 12/2007 | Haga | H02K 3/325 310/71 |
| 2010/0308700 | A1* | 12/2010 | Isoda | H02K 5/225 310/68 D |
| 2012/0098391 | A1* | 4/2012 | Yamasaki | B62D 5/0406 310/68 D |
| 2012/0286593 | A1* | 11/2012 | Yokogawa | H02K 1/278 310/43 |
| 2012/0299407 | A1* | 11/2012 | Miyama | H02K 5/18 310/63 |
| 2012/0319512 | A1* | 12/2012 | Nakagawa | H02K 1/278 310/71 |
| 2013/0264140 | A1* | 10/2013 | Nakayama | H02K 3/345 180/443 |
| 2013/0278090 | A1* | 10/2013 | Matsuo | H02K 5/20 310/54 |
| 2014/0232217 | A1* | 8/2014 | Miyama | H02K 5/20 310/52 |
| 2014/0306563 | A1* | 10/2014 | Oyama | H02M 1/12 310/71 |
| 2015/0001972 | A1* | 1/2015 | Miyama | H02K 5/24 310/52 |
| 2016/0285335 | A1* | 9/2016 | Watanabe | H02K 3/522 |
| 2017/0077779 | A1* | 3/2017 | Hanioka | H02K 5/18 |

FOREIGN PATENT DOCUMENTS

| | | |
|---|---|---|
| JP | 61-49630 A | 3/1986 |
| JP | 5-252688 A | 9/1993 |
| JP | 7-245917 A | 9/1995 |
| JP | 8-322170 A | 12/1996 |
| JP | 2002-186222 A | 6/2002 |
| JP | 2011-177001 A | 9/2011 |
| JP | 2013-126298 A | 6/2013 |
| JP | 2013-211938 A | 10/2013 |
| WO | WO 2013/038572 A1 | 3/2013 |
| WO | 2015/087567 A1 | 6/2015 |

OTHER PUBLICATIONS

Combined Chinese Office Action and Search Report dated Oct. 18, 2017 in Chinese Patent Application No. 201480068775.0 (with English translation of the Office Action and English translation of Category of Cited Documents).

International Search Report dated Jan. 13, 2015 in PCT/JP14/077799 Filed Oct. 20, 2014.

Office Action dated Nov. 29, 2016 in Japanese Patent Application No. 2015-553407 (with English language translation).

* cited by examiner

MECHANICALLY AND ELECTRICALLY INTEGRATED DRIVING APPARATUS AND MANUFACTURING METHOD THEREFOR

TECHNICAL FIELD

The present invention relates to a driving apparatus that is used in an electric vehicle or a hybrid vehicle, for example, and particularly relates to a mechanically and electrically integrated driving apparatus in which an inverter is mounted internally, and to a manufacturing method therefor.

BACKGROUND ART

In conventional intelligent motors, a driving unit that has a function that controls driving of the motor is built into a housing of the motor. The driving unit is connected to windings of the motor by means of connecting cables (see Patent Literature 1, for example).

CITATION LIST

Patent Literature

[Patent Literature 1]
Japanese Patent Laid-Open No. HEI 5-252688 (Gazette) (Second Column, Lines 38 through 45, and FIG. 1)

SUMMARY OF THE INVENTION

Problem to be Solved by the Invention

Generally, a servomotor is required for each shaft in a numerically controlled machine tool or a robot, etc., and because a driving unit is also required for each of the servomotors, wiring is complicated for the system as a whole. In regard to that, because the driving unit is built into the housing in conventional intelligent motors such as that described above, complexity in the wiring can be relieved.

However, because the intelligent motor according to Patent Literature 1 is not actively cooled using a coolant such as water, etc., cooling becomes insufficient when applied to motors that have high output and that generate large amounts of heat, such as electric vehicle drive motors or hybrid vehicle drive motors, for example, and there is a risk that the windings may melt, or power modules of inverter units that constitute the driving unit may generate heat and be damaged.

The present invention aims to solve the above problems and an object of the present invention is to provide a mechanically and electrically integrated driving apparatus and a manufacturing method therefor that can be applied to applications that have high output and that generate large amounts of heat.

Means for Solving the Problem

A mechanically and electrically integrated driving apparatus according to the present invention includes: a cylindrical frame unit; a motor unit that includes: a stator core; a plurality of windings that are mounted to the stator core; and a rotor unit that is inserted into the stator core, the motor unit being housed in the frame unit; and an inverter unit that includes: power modules that supply electric power to the motor unit; and a power module driving circuit board that drives the power modules, the inverter unit being housed in the frame unit, wherein: a common coolant flow channel for cooling the motor unit and the inverter unit is disposed inside a wall portion of the frame unit; the power modules are placed in close contact with an inner wall surface of the frame unit; a bracket that is separate from the frame unit is fitted into the frame unit; and a space inside the frame unit is divided by the bracket into: a space in which the motor unit is housed; and a space in which the inverter unit is housed.

A manufacturing method for a mechanically and electrically integrated driving apparatus according to the present invention includes steps of: placing a bracket over an end portion of a stator core to which a plurality of windings have been mounted; integrating the stator core, the windings, and the bracket by molding; fixing an assemblage that includes the stator core, the windings, and the bracket by press-fitting or shrinkage-fitting inside a cylindrical frame unit in which a coolant flow channel is disposed inside a wall portion; inserting a rotor unit inside the stator core and rotatably holding a shaft of the rotor unit by a bearing; and fixing power modules to the frame unit such that radiating surfaces thereof are placed in close contact with an inner wall surface of the frame unit.

Effects of the Invention

According to the mechanically and electrically integrated driving apparatus and manufacturing method therefor according to the present invention, the motor unit and the power modules can be cooled efficiently, enabling the present invention to be applied to applications that have high output and that generate large amounts of heat.

DESCRIPTION OF EMBODIMENTS

Preferred embodiments for implementing the present invention will now be explained with reference to the drawings.

Embodiment 1

Figure 1:
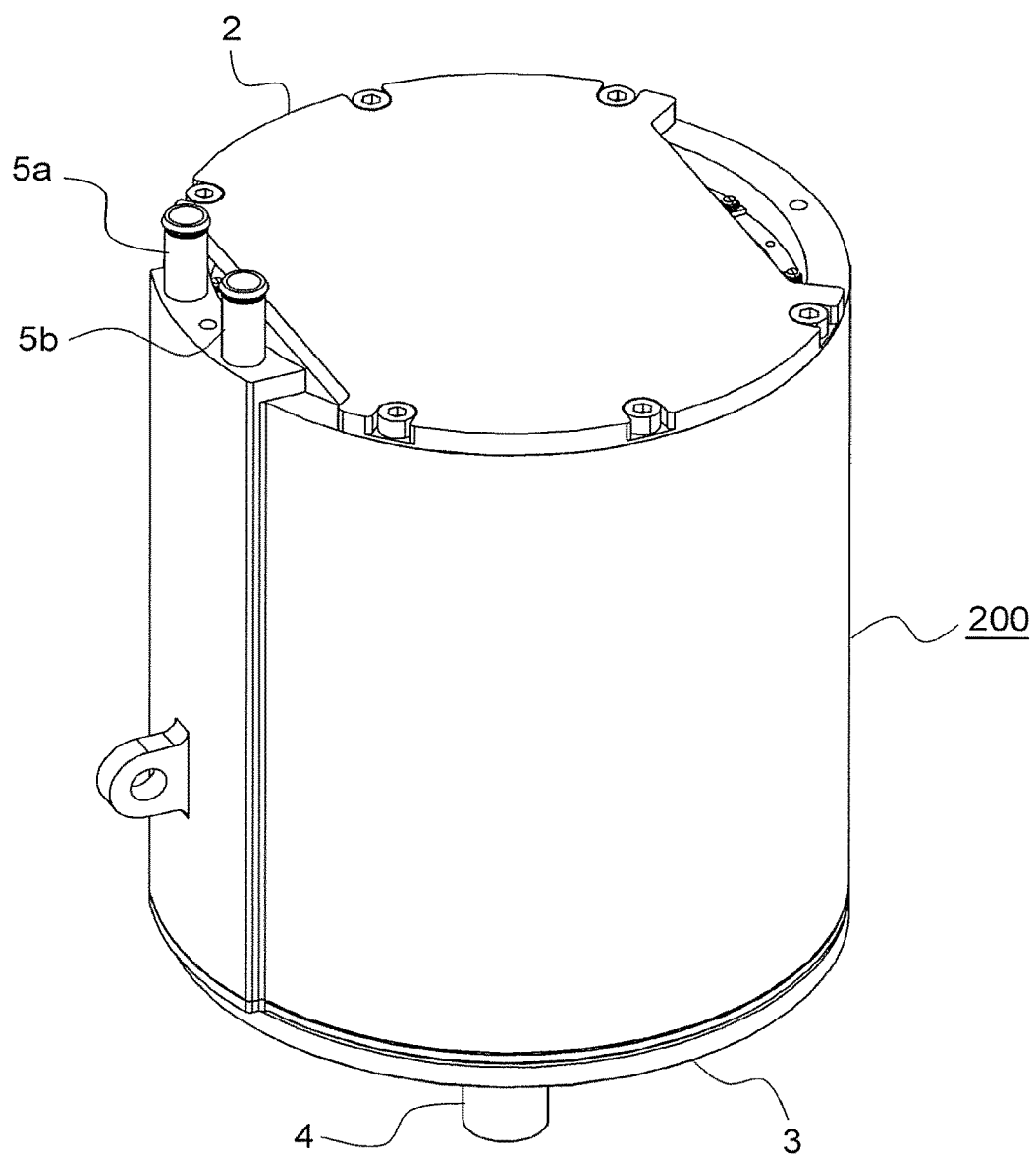
FIG. 1 is an oblique projection that shows a mechanically and electrically integrated driving apparatus according to Embodiment 1 of the present invention.

FIG. 1 is an oblique projection that shows a mechanically and electrically integrated driving apparatus according to Embodiment 1 of the present invention. A front plate 2 that constitutes an inlet-side cover is placed over a first axial end portion (an upper end portion in FIG. 1) of a cylindrical frame unit 200. An end plate 3 that constitutes an outlet-side cover is placed over a second axial end portion (a lower end portion in FIG. 1) of the frame unit 200.

An output protrudes out of the frame unit 200 from a central portion of the end plate 3. The output shaft 4 is disposed so as to be coaxial with the frame unit 200.

An inlet-side nipple 5a for supplying a liquid coolant (a coolant) to the frame unit 200, and an outlet-side nipple 5b for discharging the liquid coolant from the frame unit 200 are mounted to an end surface of the frame unit 200 that is near the front plate 2.

Figure 2:
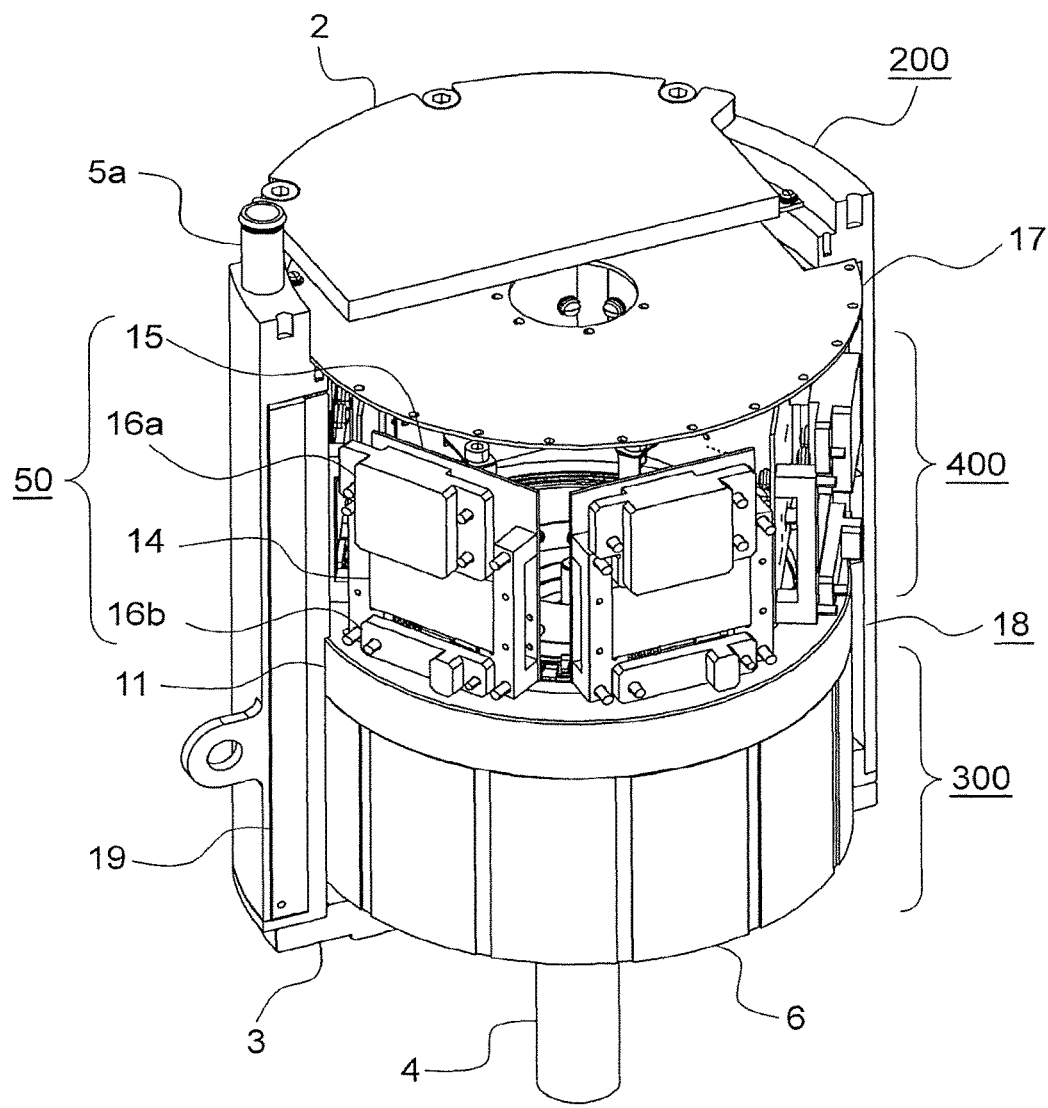
FIG. 2 is an oblique projection that shows a state in which a portion of a frame unit from FIG. 1 is removed to expose an internal portion of the frame unit.

FIG. 2 is an oblique projection that shows a state in which a portion of the frame unit 200 from FIG. 1 is removed to expose an internal portion of the frame unit 200. A motor unit 300, an inverter unit 400, and a discoid inverter controlling circuit board 17 are primarily housed inside the frame unit 200.

The inverter controlling circuit board 17 is disposed nearer to the first axial end portion of the frame unit 200 than the inverter unit 400. The motor unit 300 is disposed nearer to the second axial end portion of the frame unit 200 than the inverter unit 400. In other words, the inverter unit 400 is disposed between the motor unit 300 and the inverter controlling circuit board 17.

Torque that is generated by the motor unit 300 is transmitted externally by the output shaft 4. A space inside the frame unit 200 is divided by a discoid outer bracket 11 into a space in which the motor unit 300 is housed and a space in which the inverter unit 400 is housed.

The outer bracket 11 is fitted inside the frame unit 200. An outer circumferential surface of the outer bracket 11 closely contacts an inner circumferential surface of the frame unit 200.

The inverter unit 400 includes six modular units 50 that are disposed in an annular shape. Each of the modular units 50 primarily has: a power module 14 that supplies electric power to the motor unit 300; a power module driving circuit board 15 that drives the power module 14; and first and second electrically insulating members 16a and 16b that electrically insulate between the power module driving circuit board 15 and the frame unit 200.

An electrically insulating plastic, glass-reinforced epoxy resin, or ceramic that does not contain carbon, for example, can be used as a material for the electrically insulating members 16a and 16b.

A coolant flow channel 18 for passage of a liquid coolant is disposed inside a wall portion of the frame unit 200. The coolant flow channel 18 is partitioned off by a partitioning plate 19 that is disposed on one portion of the frame unit 200 in a circumferential direction.

The liquid coolant, which is supplied through the inlet-side nipple 5a, is partitioned off by the partitioning plate 19 so as to circulate in the circumferential direction through the coolant flow channel 18 of the frame unit 200 and be discharged through the outlet-side nipple 5b. Thus, the motor unit 300 and the inverter unit 400 are simultaneously cooled by circulating the liquid coolant through the coolant flow channel 18.

Figure 3:
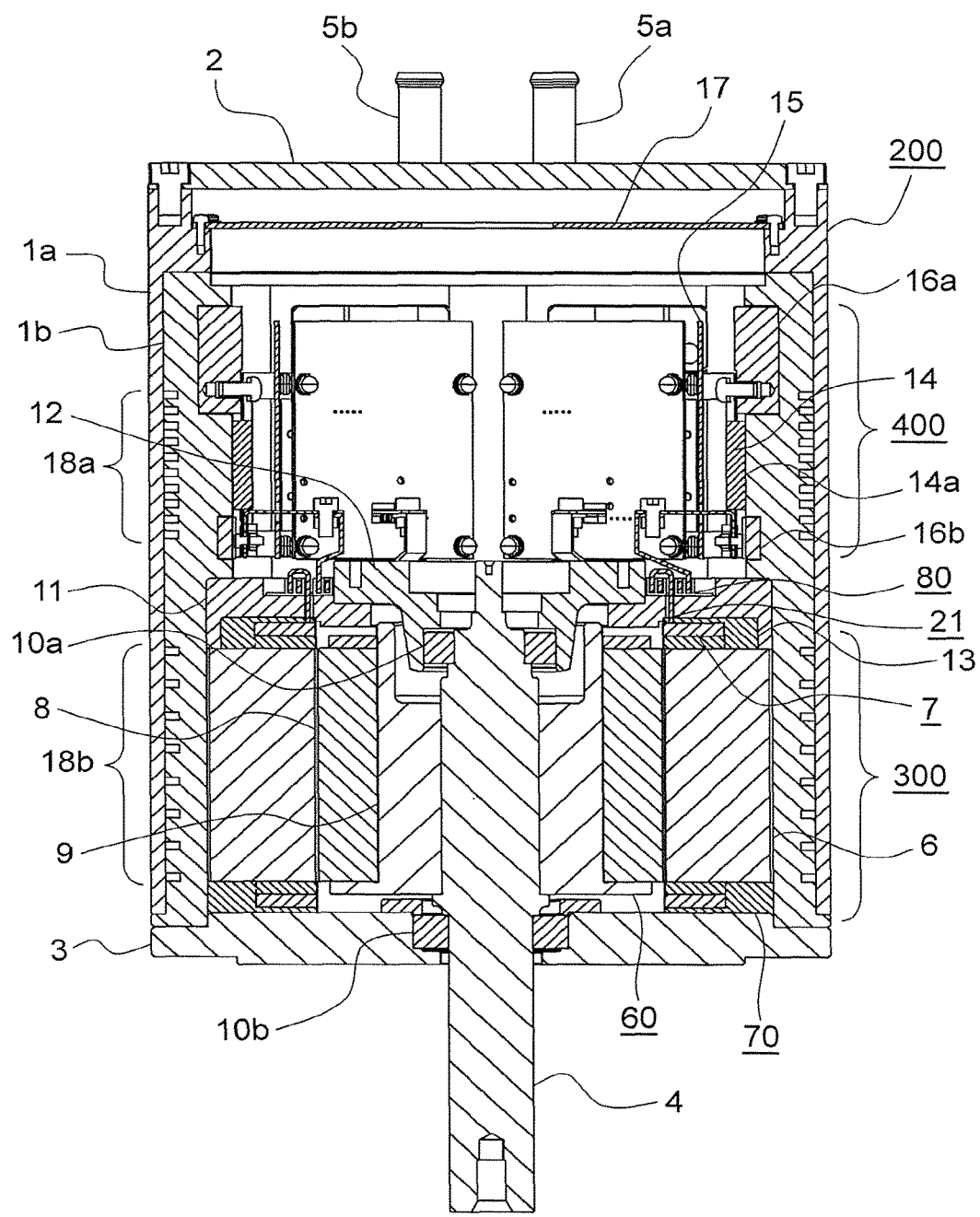
FIG. 3 is a cross section that is taken parallel to a shaft axis of the mechanically and electrically integrated driving apparatus from FIG. 1.

Next, a construction of the mechanically and electrically integrated driving apparatus, including electrical connection between the motor unit 300 and the inverter unit 400 will be explained in detail. FIG. 3 is a cross section (a longitudinal cross section) that is taken parallel to a shaft axis of the mechanically and electrically integrated driving apparatus from FIG. 1.

The frame unit 200 has a dual construction that has: an outer frame 1a; and an inner frame 1b that is mounted inside the outer frame 1a. Both the outer frame 1a and the inner frame 1b have constructions that have no joints in an axial direction. In other words, the outer frame 1a is constituted by a single member that is continuous in the axial direction, and the inner frame 1b is also constituted by a single member that is continuous in the axial direction.

The inner frame 1b is fitted inside the outer frame 1a. An outer circumferential surface of the inner frame 1b is thereby placed in close contact with an inner circumferential surface of the outer frame 1a. The inverter controlling circuit board 17 is fixed in a vicinity of an inlet of the outer frame 1a, i.e., in a vicinity of the first axial end portion (an upper end portion in FIG. 3).

The motor unit 300 and the inverter unit 400 are held inside the inner frame 1b. The coolant flow channel 18 is formed by disposing grooves on the outer circumferential surface of the inner frame 1b. The coolant flow channel 18 has: inverter-side coolant flow channels 18a for cooling the power modules 14; and motor-side coolant flow channels 18b for cooling the motor unit 300.

The inverter-side coolant flow channels 18a are disposed so as to surround the power modules 14. The motor-side coolant flow channels 18b are disposed so as to surround the motor unit 300. In addition, the motor-side coolant flow channels 18b are formed so as to be spaced apart in the axial direction of the frame unit 200 from the inverter-side coolant flow channels 18a.

The front plate 2 is fixed by fastening screws to a first axial end surface of the outer frame 1a. The end plate 3 is fixed by fastening screws to a second axial end surface of the inner frame 1b.

The motor unit 300 has: a cylindrical stator unit 70; and a rotor unit 60 that is inserted inside the stator unit 70. The stator unit 70 has: a cylindrical stator core 6; a plurality of windings 7 that are mounted to the stator core 6; and a resin material 13 that molds these. The stator core 6 is made of an iron material such as electromagnetic steel sheets.

The output shaft 4 is press-fitted centrally into the rotor unit 60. The rotor unit 60 rotates around the output shaft 4 together with the output shaft 4.

The outer bracket 11 comes into contact with a first axial end surface (an upper surface) of the stator core 6. A discoid inner bracket 12 is fitted closely inside the outer bracket 11.

A first bearing 10a is fitted into and held by the inner bracket 12. A second bearing 10b is fitted into and held by the end plate 3. The output shaft 4 is rotatably held by the first and second bearings 10a and 10b.

A space inside the inner frame 1b is divided into two chambers by the outer bracket 11, the inner bracket 12, the first bearing 10a, and the output shaft 4, and the space that houses the motor unit 300 and the space that houses the inverter unit 400 are physically isolated.

Figure 4:
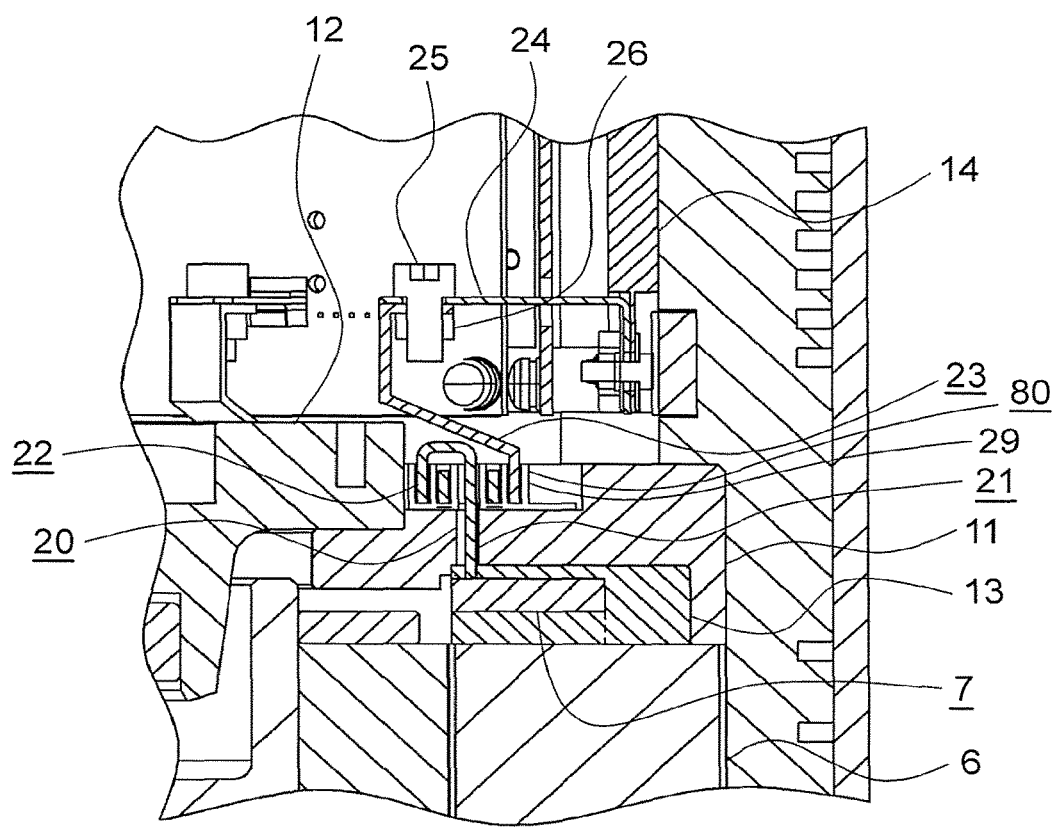
FIG. 4 is a cross section that shows part of FIG. 3 enlarged.

FIG. 4 is a cross section that shows part of FIG. 3 enlarged. A plurality of leader line insertion apertures 20 are disposed on the outer bracket 11. Leader lines 21 from the windings 7 are inserted into the leader line insertion apertures 20. The leader lines 21 pass through the leader line insertion apertures 20.

A connecting base 29 is fixed to an end portion of the outer bracket 11 that is near the inverter unit 400. A connector 80 for connecting the power modules 14 and the windings 7 is mounted to the connecting base 29. The connector 80 has a plurality of connecting conductors (a connecting board) 22 that are (is) inserted into the connecting base 29.

Tip end portions of the respective leader lines 21 are folded and bent into a U shape, and are connected to the connecting conductors 22. A connecting terminal 23 is disposed on each of the connecting conductors 22. An end portion of each of the connecting terminals 23 that is near the inverter unit 400 is fastened to an output terminal 24 of a corresponding power module 14 by a bolt 25 and a nut 26.

Figure 5:
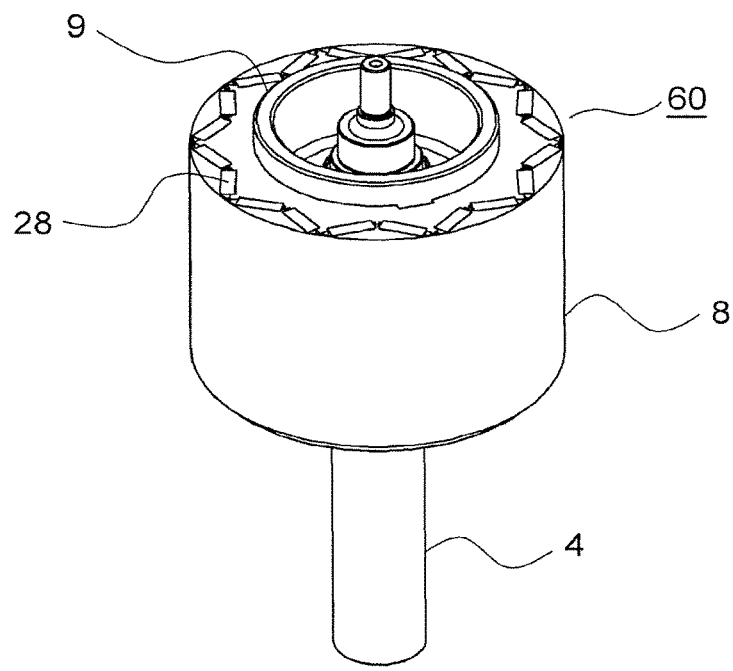
FIG. 5 is an oblique projection that shows a rotor unit from FIG. 3.

FIG. 5 is an oblique projection that shows the rotor unit 60 from FIG. 3. The rotor unit 60 has: a cylindrical rotor core 8 on which a plurality of magnet insertion apertures are disposed; a plurality of magnets 28 that are inserted into the magnet insertion apertures; and a spacer 9 that couples together the output shaft 4 and the rotor core 8.

Figure 6:
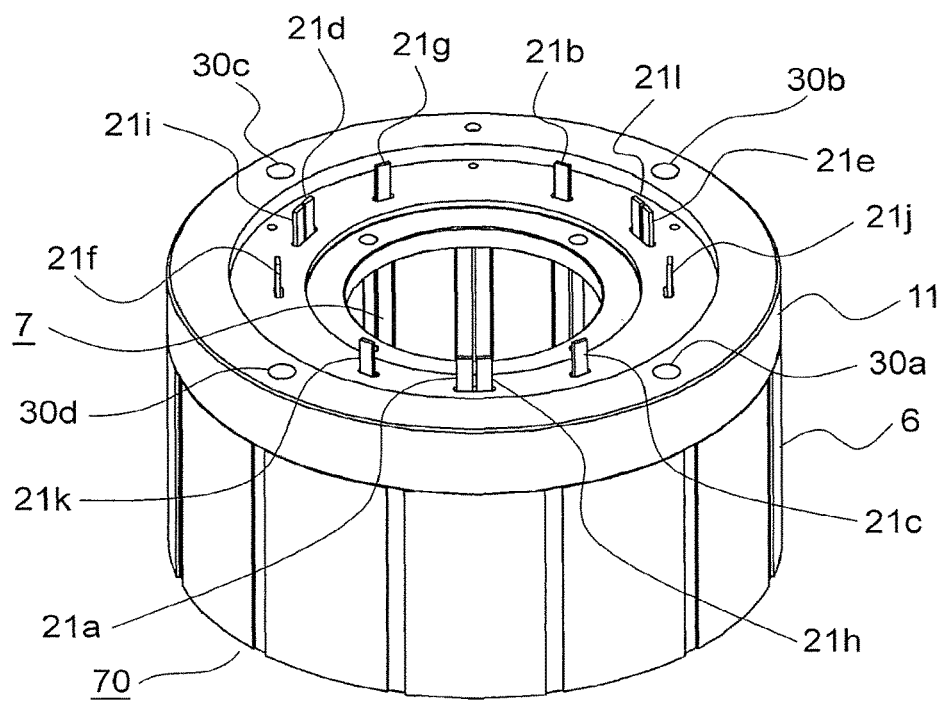
FIG. 6 is an oblique projection that shows a state of a stator unit from FIG. 3 before molding.

FIG. 6 is an oblique projection that shows a state of the stator unit 70 from FIG. 3 before molding. The leader lines 21a through 21l from the windings 7 are led out so as to pass through the outer bracket 11. In this state, the tip ends of the leader lines 21a through 21l are not yet bent. Four resin injection apertures 30a through 30d for injecting the resin material 13 (FIG. 3) during molding are disposed on the outer bracket 11.

Figure 7:
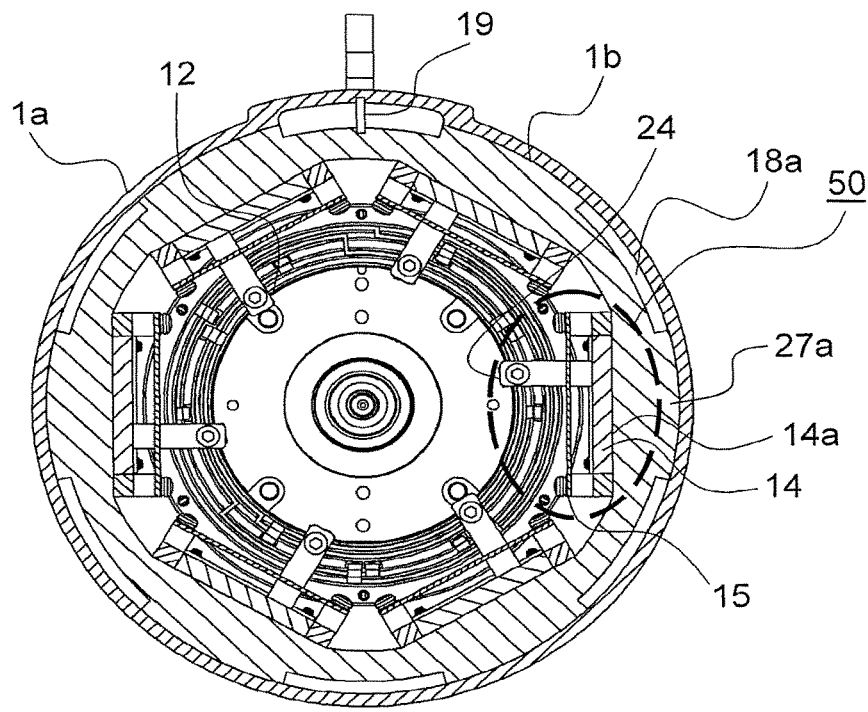
FIG. 7 is a cross section that is perpendicular to a shaft axis of an inverter unit portion from FIG. 3.

Next, the construction of a cross section that is perpendicular to the shaft axis of the mechanically and electrically integrated driving apparatus according to Embodiment 1 will be explained. FIG. 7 is a cross section (a lateral cross section) that is perpendicular to a shaft axis of the inverter unit portion 400 from FIG. 3. In FIG. 7, the six modular units 50 are disposed every 60 degrees in an annular shape. Radiating surfaces 14a of the power modules 14 are fixed so as to be placed in close contact with inner wall surfaces of the inner frame 1b that is machined into an approximate hexagon shape.

A plurality of inverter-side radiating fins 27a are formed around an outer circumference of the inner frame 1b. The inverter-side radiating fins 27a are disposed outside (on a reverse side from) portions of the inner frame 1b with which the radiating surfaces 14a are placed in close contact. Heat from the radiating surfaces 14a is transferred to the inverter-side radiating fins 27a, and is taken away by the liquid coolant that flows circumferentially through the inverter-side coolant flow channels 18a. The power modules 14 are thereby cooled efficiently.

Figure 8:
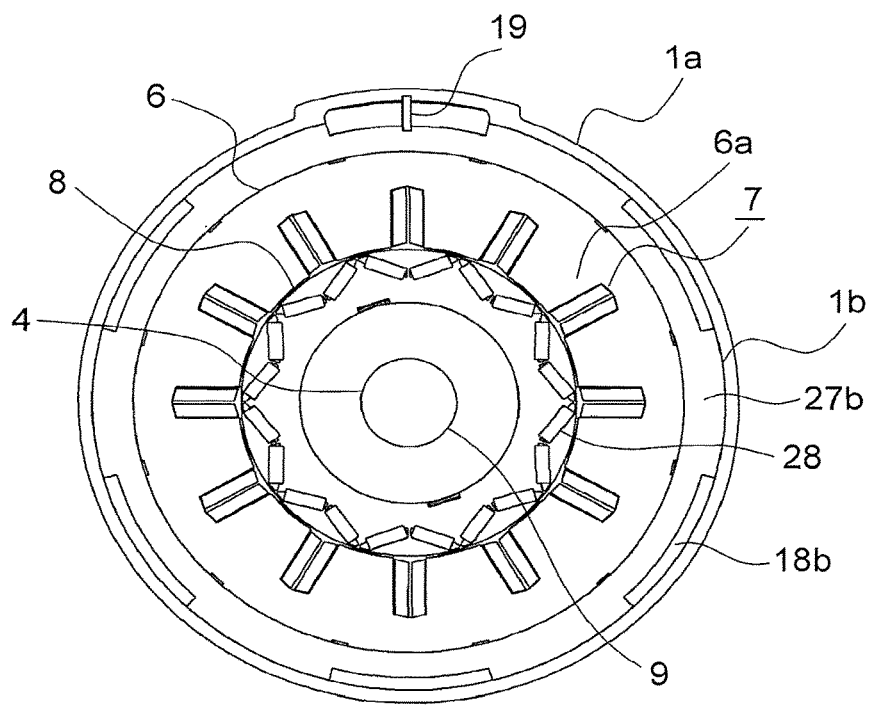
FIG. 8 is a cross section that is perpendicular to a shaft axis of a motor unit portion from FIG. 3.

FIG. 8 is a cross section (a lateral cross section) that is perpendicular to a shaft axis of the motor unit portion 300 from FIG. 3. The windings 7 are mounted onto teeth 6a of the stator core 6 from an inner circumferential side. The stator core 6 is fixed to the inner frame 1b by fixing the outer bracket 11 inside the inner frame 1b by press-fitting or shrinkage-fitting.

A plurality of motor-side radiating fins 27b are formed around an outer circumference of the inner frame 1b. The motor-side radiating fins 27b are disposed within a portion of the inner frame 1b that correspond to the motor-side coolant flow channels 18b in the axial direction and within a range that is similar or identical to that of the inverter-side radiating fins 27a in the circumferential direction of the inner frame 1b. Heat that is generated by the motor unit 300 is transferred to the motor-side radiating fins 27b, and is taken away by the liquid coolant that flows circumferentially through the motor-side coolant flow channels 18b. The motor unit 300 is thereby cooled efficiently.

Figure 9:
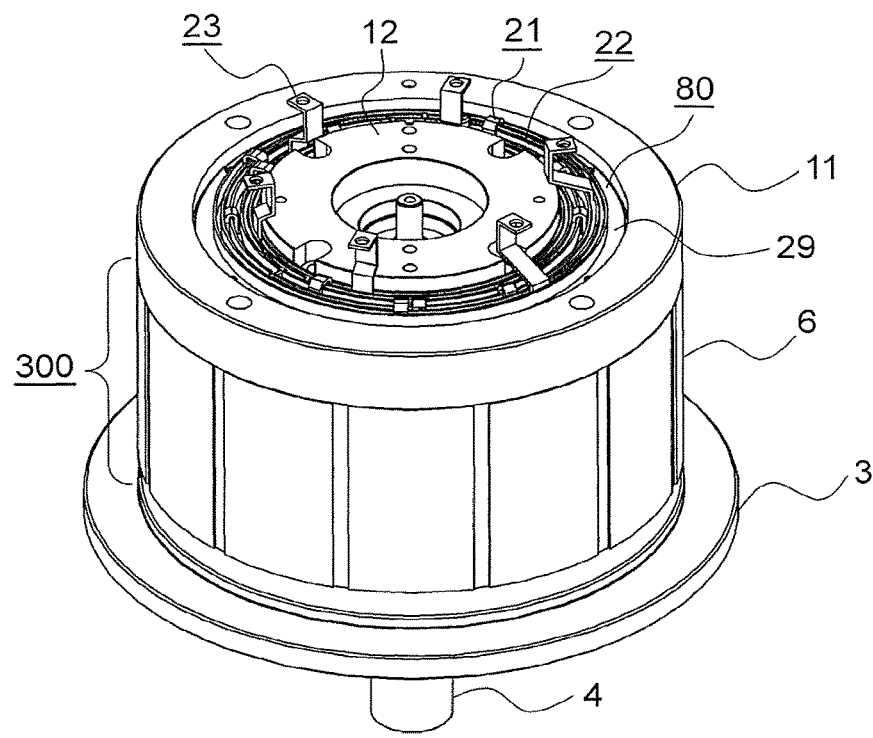
FIG. 9 is an oblique projection that shows the motor unit from FIG. 3 and parts that are associated therewith.

Next, constructions of the outer bracket 11 and the connector 80 will be explained in detail. FIG. 9 is an oblique projection that shows the motor unit 300 from FIG. 3 and parts that are associated therewith, and FIG. 10 is an oblique projection that shows a state in which the outer bracket 11 from FIG. 9 and parts that are mounted thereto are removed.

As shown in FIG. 9, the outer bracket 11 is placed over the motor unit 300. A connecting base 29 is fixed to an axial end surface of the outer bracket 11 that is near the inverter unit 400. Connecting conductors 22 are held by the connecting base 29. The tip ends of the leader lines 21 that are led out from the windings 7 are connected to the connecting conductors 22.

Figure 10:
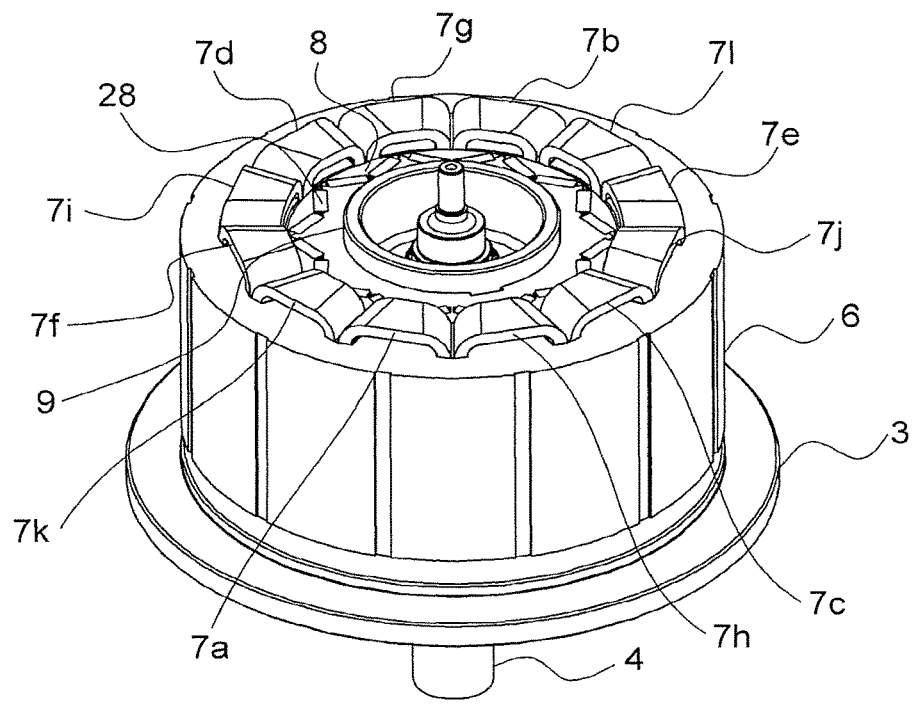
FIG. 10 is an oblique projection that shows a state in which an outer bracket from FIG. 9 and parts that are mounted thereto are removed.

In addition, as shown in FIG. 10, twelve windings 7a through 7l are mounted to the stator core 6.

Figure 11:
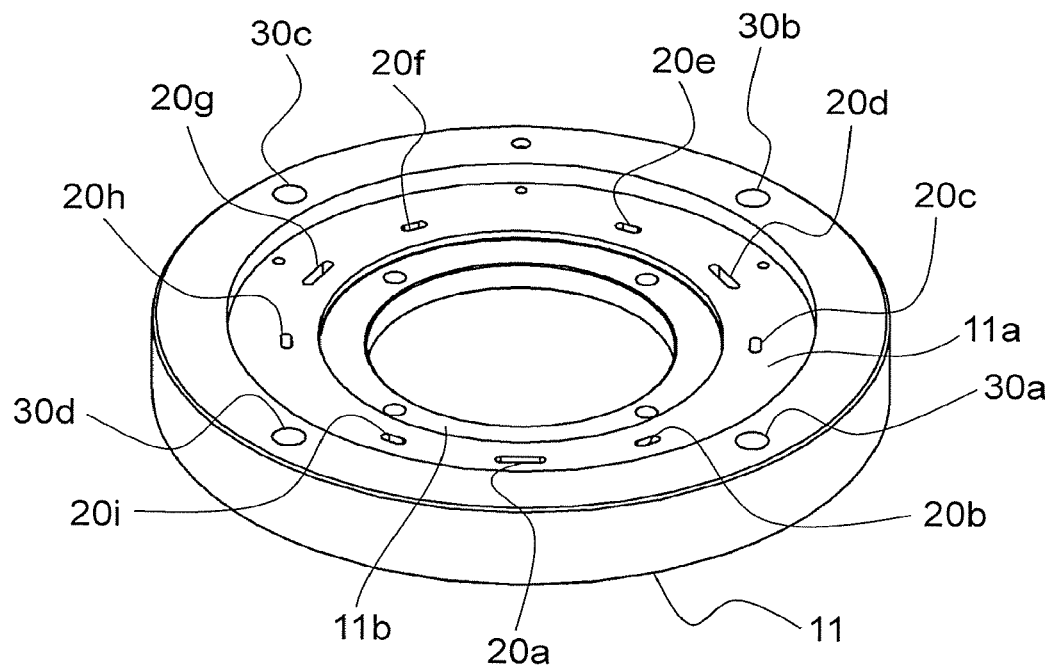
FIG. 11 is an oblique projection that shows the outer bracket from FIG. 9.

FIG. 11 is an oblique projection that shows the outer bracket 11 from FIG. 9. A circular first recess portion (a stepped portion) 11a is disposed on an end portion of the outer bracket 11 that faces the inverter unit 400. A circular second recess portion (a stepped portion) 11b is disposed centrally on the first recess portion. A circular opening is disposed centrally on the second recess portion 11b.

Resin injection apertures 30a through 30d are disposed on portions of the outer bracket 11 that are radially further outward than the first recess portion 11a. Leader line insertion apertures 20a through 20i that correspond to the leader line insertion apertures 20 that are shown in FIG. 4 are disposed on the first recess portion 11a. The leader lines 21a through 20l that are shown in FIG. 6 are passed through the leader line insertion apertures 20a through 20i.

An outer circumference of the connecting base 29 is fitted into the first recess portion 11a. In other words, the first recess portion 11a is a connecting base interfitting portion.

An outer circumference of the inner bracket 12 is fitted into the second recess portion 11b. In other words, the second recess portion 11b is an inner bracket interfitting portion. The inner bracket 12 is positioned so as to be coaxial to the outer bracket 11 by fitting the inner bracket 12 into the second recess portion 11b.

Figure 12:
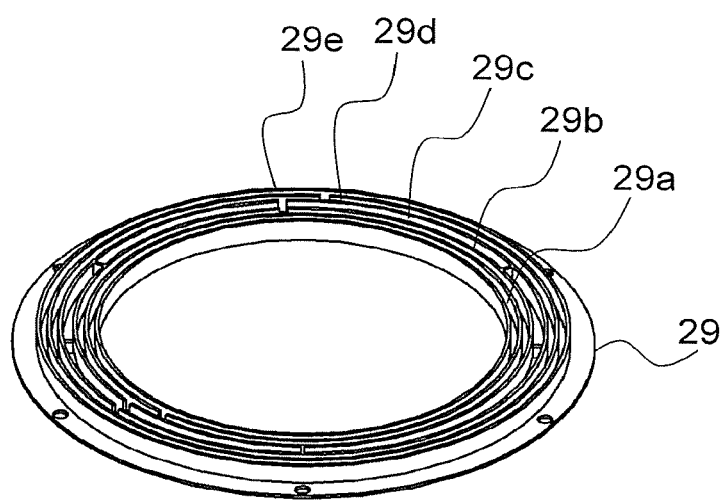
FIG. 12 is an oblique projection that shows a connecting base from FIG. 9.

FIG. 12 is an oblique projection that shows the connecting base 29 from FIG. 9. Five concentric circular grooves 29a through 29e are formed on the connecting base 29. As can also be seen from FIG. 4, the connecting conductors 22 are inserted into two inner circumferential grooves 29a and 29b and two outer circumferential grooves 29d and 29e. Misalignment of the connector 80 is prevented by inserting the connecting conductors 22 into the connecting base 29.

A plurality of apertures (not shown) that are continuous with the leader line insertion apertures 20a through 20i of the outer bracket 11 are disposed on the single groove 29c in the middle. The leader lines 21 are passed through these apertures.

The connecting base 29 is constituted by an electrically insulating material such as a glass-reinforced epoxy resin, or a plastic that does not contain carbon, for example. Electrical insulation between the connecting conductors 22 and between the connector 80 and the outer bracket 11 is ensured thereby.

Figure 13:
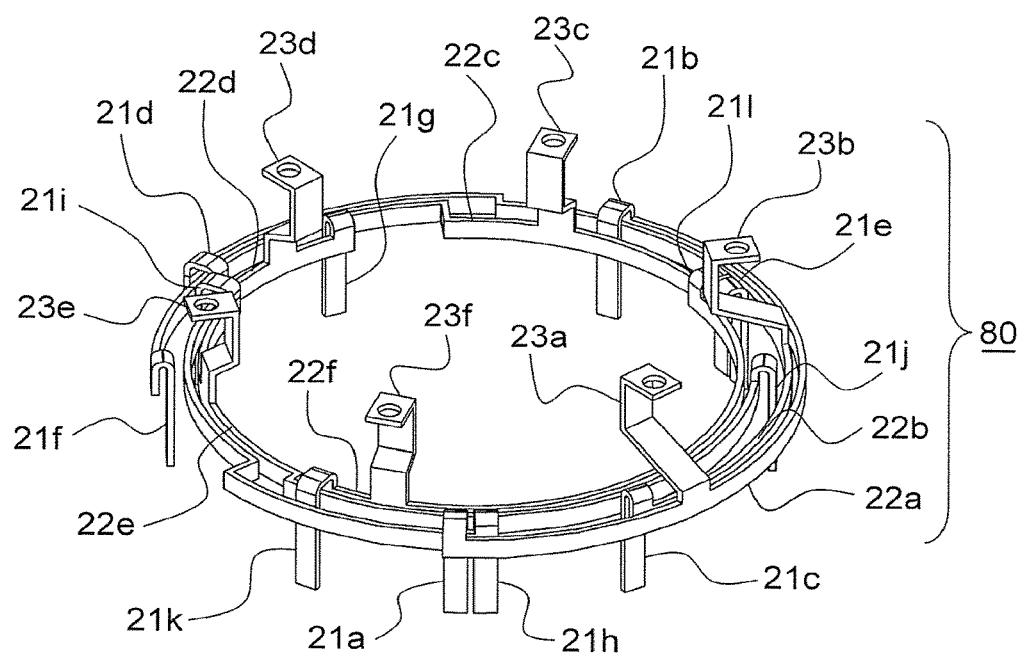
FIG. 13 is an oblique projection that shows a connected state among a connector, leader lines, and connecting terminals from FIG. 9.
Figure 14:
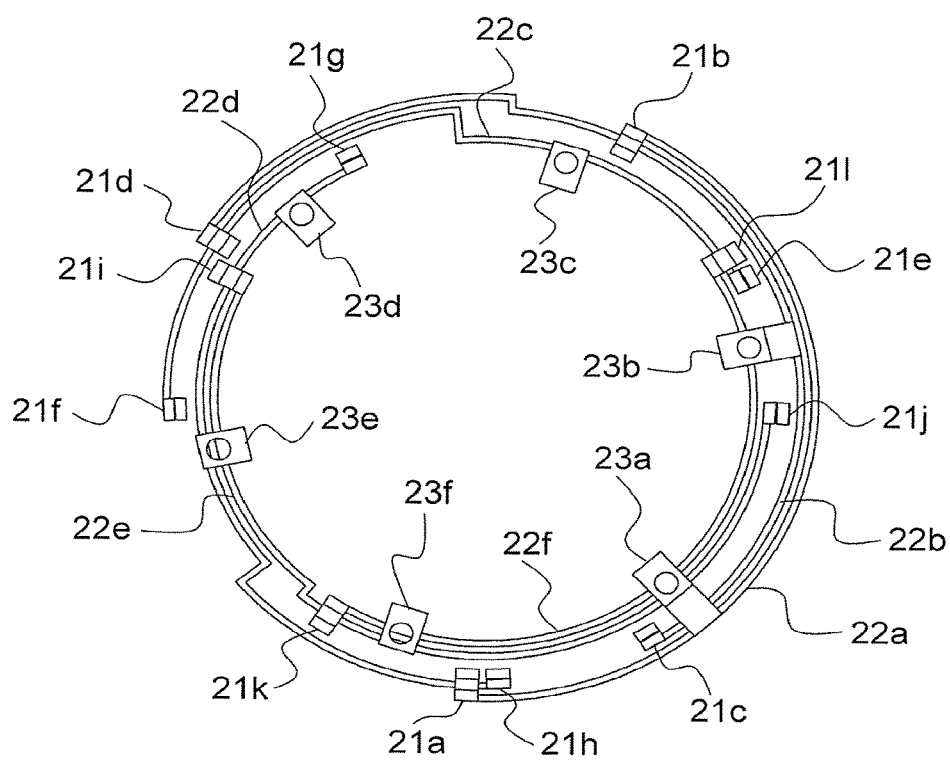
FIG. 14 is a plan that shows the connected state among the connector, the leader lines, and the connecting terminals from FIG. 9.

FIG. 13 is an oblique projection that shows a connected state among the connector 80, the leader lines 21, and the connecting terminals 23 from FIG. 9, and FIG. 14 is a plan that shows the connected state among the connector 80, the leader lines 21, and the connecting terminals 23 from FIG. 9.

Among the conductors that are shown in FIGS. 13 and 14, portions other than the twelve leader lines 21a through 21l from the windings 7a through 7l constitute the connector 80. In other words, the connector 80 is constituted by the six circular arc-shaped connecting conductors 22a through 22f that are disposed concentrically. Six connecting terminals 23a through 23f that respectively rise up from the connecting conductors 22a through 22f are disposed on the connector 80.

A connecting terminal 23a rises up from the connecting conductor 22a. Tip end portions of the leader lines 21a and 21b are folded into an inverted U shape, and are joined together with an upper surface of the connecting conductor 22a.

A connecting terminal 23b rises up from the connecting conductor 22b. Tip end portions of the leader lines 21c and 21d are folded into an inverted U shape, and are joined together with an upper surface of the connecting conductor 22b.

A connecting terminal 23c rises up from the connecting conductor 22c. Tip end portions of the leader lines 21e and 21f are folded into an inverted U shape, and are joined together with an upper surface of the connecting conductor 22c.

A connecting terminal 23d rises up from the connecting conductor 22d. Tip end portions of the leader lines 21g and 21h are folded into an inverted U shape, and are joined together with an upper surface of the connecting conductor 22d.

A connecting terminal 23e rises up from the connecting conductor 22e. Tip end portions of the leader lines 21i and 21j are folded into an inverted U shape, and are joined together with an upper surface of the connecting conductor 22e.

A connecting terminal 23f rises up from the connecting conductor 22f. Tip end portions of the leader lines 21k and 21l are folded into an inverted U shape, and are joined together with an upper surface of the connecting conductor 22f.

The connecting terminals 23a through 23f are disposed uniformly every 60 degrees circumferentially around the outer bracket 11, as shown in FIG. 14. The position and angle at which the connecting terminal 23b rises up from the connecting conductor 22b, for example, are adjusted so as to be aligned with a position of an output terminal 24 of a power module 14 that is shown in FIG. 7. This is similar or identical for the other five connecting terminals 23a, and 23c through 23f.

Thus, the leader lines 21c and 21d from the windings 7c and 7d (FIG. 10) that are offset by 180 degrees and disposed so as to face each other are connected to the connecting conductor 22b, for example, and are coupled to the output terminal 24 of a power module 14 by the connecting terminal 23b. A remainder of the connecting conductors 22a, and 22c through 22f are similarly configured to gather together the leader lines 21 from two windings 7, and connect the power modules 14 using the connecting terminals 23.

Now, there is a total of six connecting conductors 22a through 22f, but there are five grooves 29a through 29e on the connecting base 29 that is shown in FIG. 12, and among them there are only four grooves into which the connecting conductors 22a through 22f are inserted, as 29c is excluded.

In regard to that, in FIG. 14, the radius of curvature of the connecting conductor 22b, for example, is modified partway along by folding and bending it to an outer circumferential side at "twelve o'clock". The connecting conductor 22b thereby avoids interfering with the connecting conductor 22c. Interference among the connecting conductors 22 is similarly avoided by also changing the radii of curvature of the connecting conductors 22c, 22d, and 22e partway along.

Moreover, the method for joining the leader lines 21a through 21l to the connecting conductors 22a through 22f may be soldering, brazing, or welding. If mechanical joining strength cannot be ensured by soldering, then solder may be performed after binding using wire, etc. In addition, if joining by surface mating rather than butting tip ends together, then more reliable electrical connection may be made by pouring solder between the mating surfaces after welding.

The connector 80 may be disposed above the inner bracket 12 instead of above the outer bracket 11. In that case, the outside diameter of the inner bracket 12 would be greater than the outside diameter of the connecting base 29, and the inside diameter of the outer bracket 11 would be expanded such that the outside diameter of the inner bracket 12 fits together therewith. In addition, the leader line insertion apertures 20*a* through 20*i* that are disposed on the outer bracket 11 would be disposed on the inner bracket 12.

Figure 15:
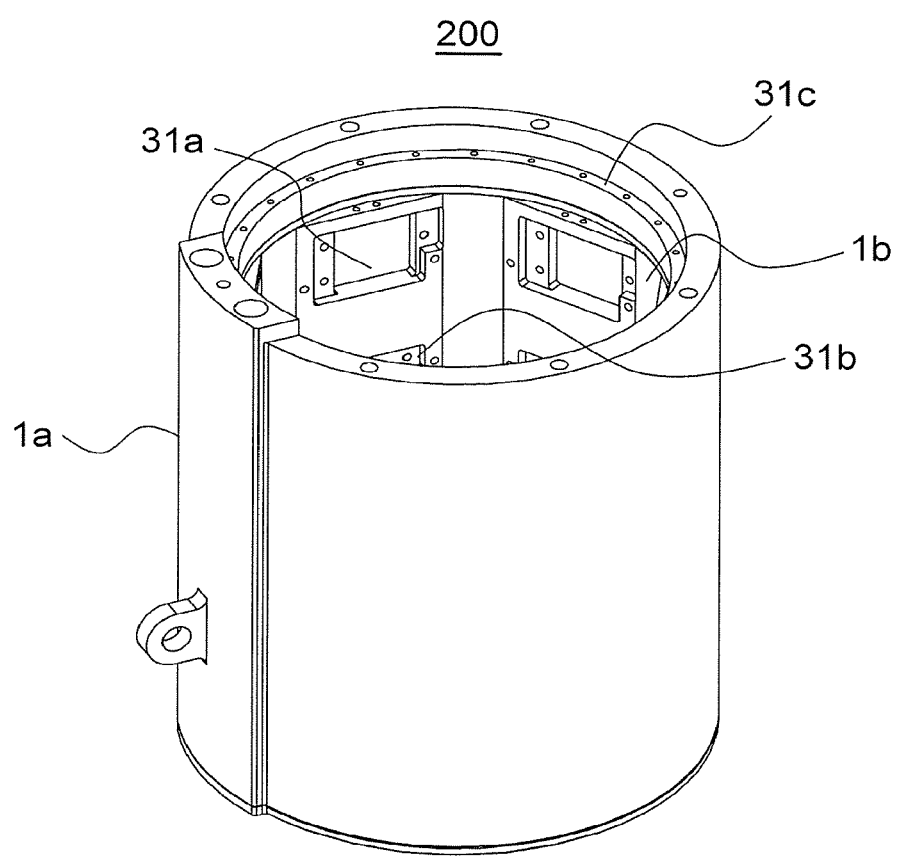
FIG. 15 is an oblique projection that shows a frame unit from FIG. 1.

Next, construction of the frame unit 200 will be explained. FIG. 15 is an oblique projection that shows the frame unit 200 from FIG. 1, and FIG. 16 is an oblique projection that shows the outer frame 1*a* from FIG. 15 with a portion removed.

First countersunk portions 31*a* into which the first electrically insulating members 16*a* that are shown in FIG. 2 are fitted, and second countersunk portions 31*b* into which the second electrically insulating members 16*b* are fitted, are formed on an inner surface of the inner frame 1*b*. A step 31*c* that bears the inverter controlling circuit board 17 is disposed on an inlet side of the outer frame 1*a*.

The outer frame 1*a* and the inner frame 1*b* are welded continuously in a circumferential direction between the inlet-side joint portion 33*a* and the outlet-side joint portion 33*b*. Sealing of the coolant flow channel 18 is thereby maintained in such a way that the liquid coolant will not leak.

Figure 16:
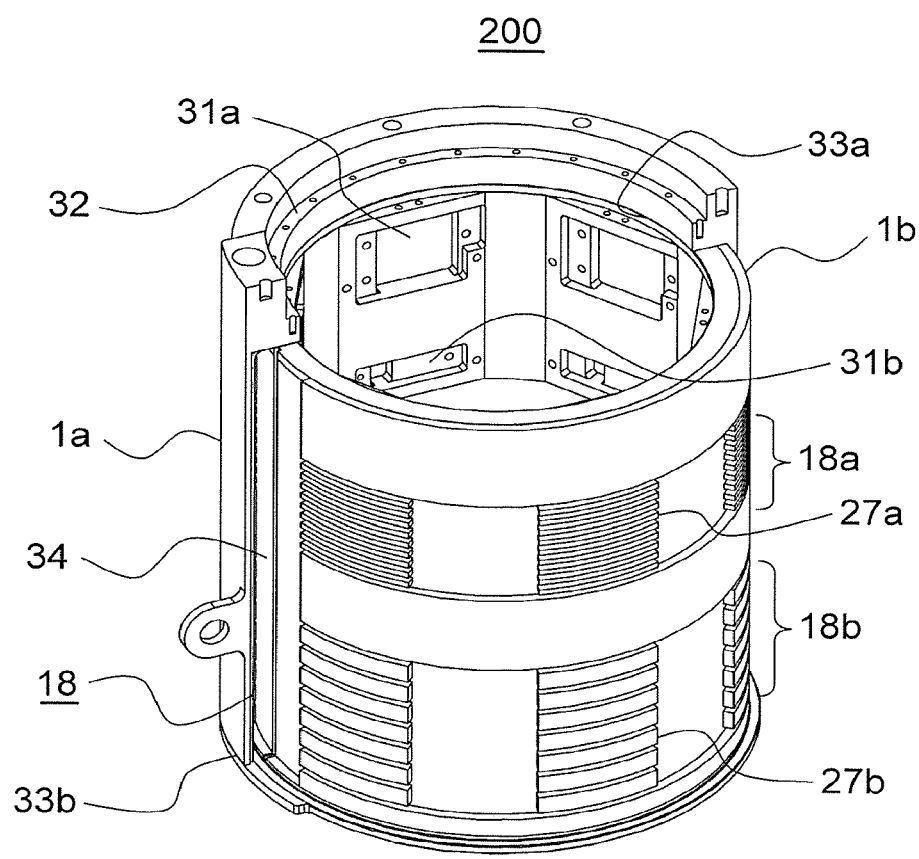
FIG. 16 is an oblique projection that shows an outer frame from FIG. 15 with a portion removed.

In FIG. 16, the inverter-side radiating fins 27*a* are formed behind positions against which the radiating surfaces 14*a* of the power modules 14 are placed in close contact. Motor-side radiating fins 27*b* are formed at identical positions to the inverter-side radiating fins 27*a* in a circumferential direction. The inverter-side coolant flow channels 18*a* and the motor-side coolant flow channels 18*b* are connected at a header portion 34 that constitutes a space portion. Thus, identical liquid coolant circulates through the coolant flow channels 18*a* and 18*b*.

The header portion 34 is connected to the inverter-side coolant flow channels 18*a* and the motor-side cooling flow channels 18*b*. The header portion 34 is divided into two compartments, a first compartment and a second compartment, by the partitioning plate 19 that is shown in FIG. 2. Liquid coolant that has entered through the inlet-side nipple 5*a* enters the first compartment of the header portion 34, and is directed axially. Next, the liquid coolant circulates circumferentially through the inverter-side coolant flow channels 18*a* and the motor-side cooling flow channels 18*b*, and returns to the second compartment of the header portion 34. Then, the liquid coolant that has returned to the second compartment is discharged through the outlet-side nipple 5*b*.

Next, operation of the mechanically and electrically integrated driving apparatus according to Embodiment 1 will be explained. Electric power is supplied to the power modules 14 of the inverter unit 400 from a direct-current power supply or a battery (not shown), and the inverter controlling circuit board 17 controls the output from the power modules 14 in accordance with commands from a microcomputer or a personal computer (not shown). In FIG. 4, the electric power is supplied from the power modules 14 to the windings 7 of the motor unit 300 through the output terminals 24, the connecting terminals 23, the connecting conductors 22, and the leader lines 21.

In the present Embodiment 1, a motor unit 300 that has two three-phase connections is presumed, the six modular units 50 are disposed in an annular shape as shown in FIG. 7, and two windings 7 are connected to one power module 14. If that is a U1 phase, the first three-phase connection is constituted by the six windings 7 the U1 phase, a V1 phase, and a W1 phase, and the second three-phase connection is constituted by the remaining six windings 7 in a U2-phase, a V2 phase, and a W2 phase.

The excitation timing of the six power modules 14 is switched by a controlling circuit that is mounted to the inverter controlling circuit board 17, to generate a rotating magnetic field using a total of twelve windings 7. The rotor unit 60 and the output shaft 4 that constitutes the rotating shaft thereof are rotated due to interaction with the rotor core 8 and the magnets 28 that are installed on the rotor unit 60.

Figure 17:
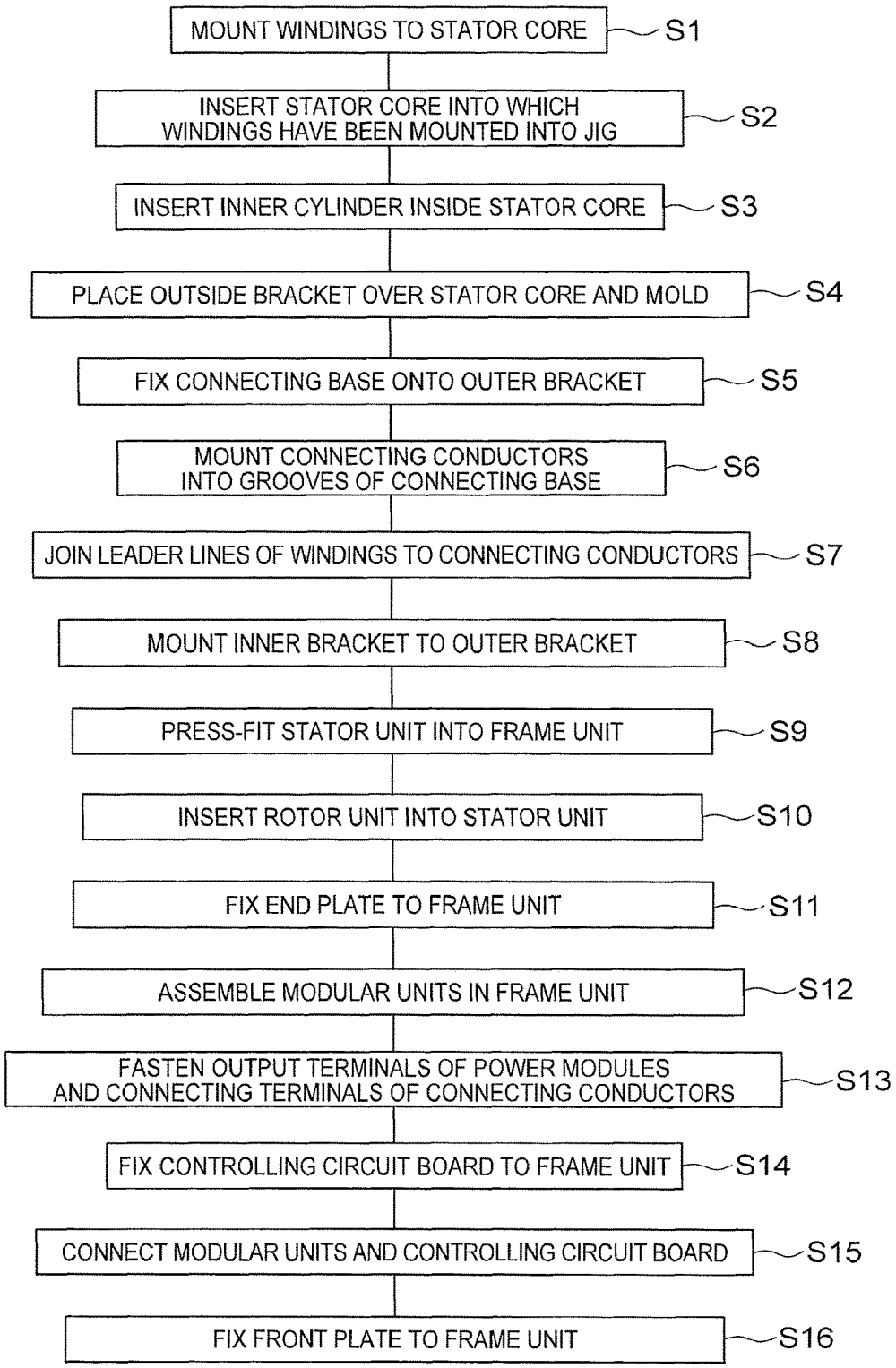
FIG. 17 is a flowchart that shows a manufacturing method for the mechanically and electrically integrated driving apparatus in FIG. 1.
Figure 18:
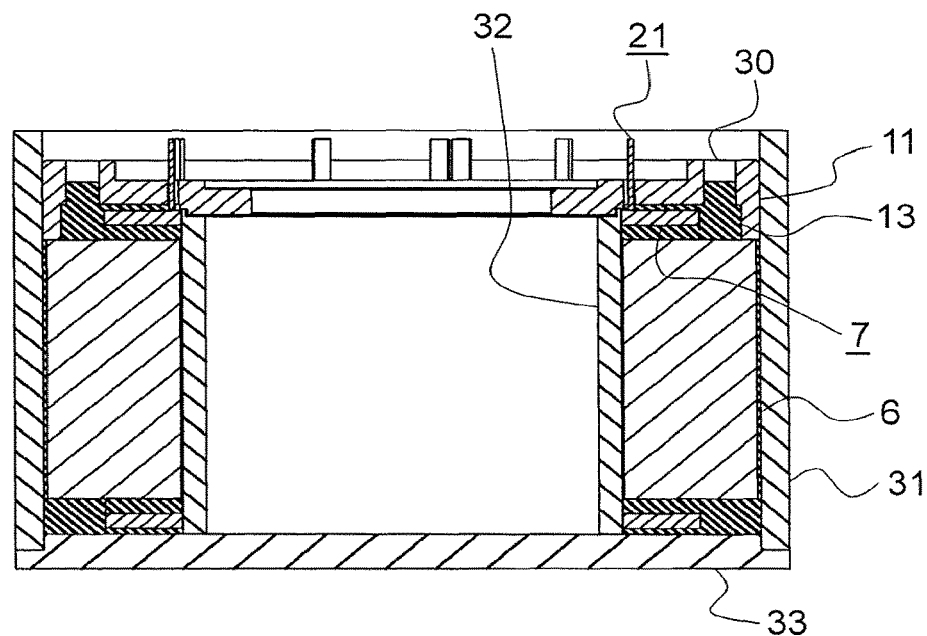
FIG. 18 is a cross section that shows an intermediate state during manufacturing of the stator unit from FIG. 3.

Next, a method for manufacturing the mechanically and electrically integrated driving apparatus according to Embodiment 1 will be explained. FIG. 17 is a flowchart that shows a manufacturing method for the mechanically and electrically integrated driving apparatus in FIG. 1. First, as shown in FIG. 8, the windings 7 are mounted to the teeth 6*a* of the stator core 6 (Step S1). Next, the stator core 6 to which the windings 7 have been mounted is inserted into a molding jig that is shown in FIG. 18 (Step S2).

The molding jig includes an outer cylinder 31, an inner cylinder 32, and a bottom plate 33. The inner cylinder 32 is inserted into an inner circumference of the stator core 6 after the stator core 6 has been inserted into the outer cylinder 31 (Step S3).

Next, the outer bracket 11 is placed onto the stator core 6, to make the state that is shown in FIG. 6. At this point, the tip ends of the leader lines 21*a* through 21*l* are inserted into the leader line insertion apertures 20*a* through 20*i* that are shown in FIG. 11. Here, two leader lines are inserted into each of the leader line insertion apertures 20*a*, 20*d*, and 20*g*, which have larger widths.

Next, a resin material 13 that constitutes a potting agent is poured in through the resin injection apertures 30*a* through 30*d*, and the temperature is raised, if required, to cure the resin material 13. The stator core 6, the windings 7, a portion of the leader lines 21 thereof, and the outer bracket 11 are thereby molded and integrated (Step S4).

The molding jig is removed after completion of molding, and the connecting base 29 is fixed onto the outer bracket 11 (Step S5). Then, the connecting conductors 22 are inserted into the grooves 29*a*, 29*b*, 29*c*, and 29*d* (FIG. 12) of the connecting base 29, to hold the connector 80 on the connecting base 29 (Step S6).

Figure 19:
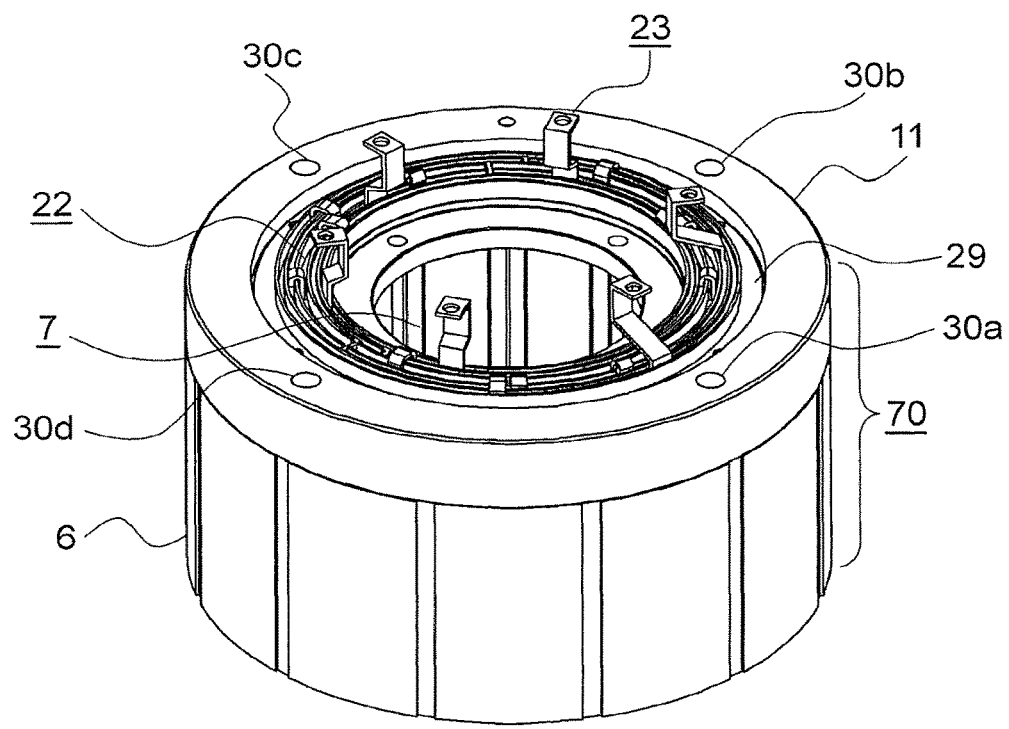
FIG. 19 is an oblique projection that shows a state in a subsequent stage after FIG. 18.

After that, the tip end portions of the leader lines 21 are bent and folded into an inverted U shape and joined to the upper surfaces of the connecting conductors 22 (Step S7). The state at this point is shown in FIG. 19.

Next, the first bearing 10*a* is mounted to the inner bracket 12 and then the inner bracket 12 is mounted to an inner circumference of the outer bracket 11 (Step S8). Then, an assemblage that includes the stator unit 70, the outer bracket 11, the connecting base 29, the connector 80, the inner bracket 12, and the first bearing 10*a* is press-fitted into the frame unit 200 from an outlet side (bottom in FIG. 3) of the frame unit 200 (Step S9). This may be fitted by shrinkage, if required.

Next, the rotor unit 60 is inserted into the inner circumference of the stator core 6, and a leading end of the output shaft 4 is held by the first bearing 10*a* (Step S10). Then, the second bearing 10*b* is mounted to the end plate 3, and the end plate 3 is fixed to an outlet-side end surface of the frame unit 200 while inserting the output shaft 4 into the second bearing 10*b* (Step S11).

The output shaft 4 is thereby rotatably held by the first and second bearings 10*a* and 10*b*. The installation of the motor unit 300 into the frame unit 200 is finished by the above, completing assembly of a lower half in FIG. 3.

Next, as shown in FIG. 3, the modular units 50 that are shown in FIG. 2 are fixed to the inner wall surfaces of the inner frame 1*b* such that the radiating surfaces 14*a* are placed in close contact therewith (Step S12). Next, as shown in FIG. 4, the output terminals 24 from the power modules 14 and the connecting terminals 23 from the connector 80 are fastened using bolts 25 and nuts 26 (Step S13).

Next, the inverter controlling circuit board 17 of the inverter unit 400 is fixed to an inlet side (an upper side in FIG. 3) of the frame unit 200 (Step S14). Then, connection between the inverter controlling circuit board 17 and the modular units 50, and electrical connection between other parts that are not shown, are performed (Step S15). Lastly, the front plate 2 is fixed to an inlet-side end surface of the frame unit 200 (Step S16). All assembly is completed thereby, resulting in the completed state that is shown in FIGS. 1 through 3.

Moreover, if the connector 80 is disposed on the inner bracket 12, then Step S4 of the flowchart in FIG. 17 is modified to "place outer bracket over stator core, and mold after mounting inner bracket", and Step 8 is deleted. Step 5 is also modified to "fix connecting base to inner bracket".

In a mechanically and electrically integrated driving apparatus according to Embodiment 1, because the motor unit 300 and the inverter unit 400 are cooled by the frame unit 200, which is cooled by passage of the liquid coolant through the common coolant flow channel 18 in the above manner, cooling efficacy is high, enabling the windings of the motor unit 300 to be prevented from melting, and the power modules 14 can also be prevented from being damaged due to the temperature thereof rising. Because of that, application to applications that have high output and that generate large amounts of heat such as electric vehicle drive motors or hybrid vehicle drive motors, for example, is enabled.

Because the stator unit 70 and the outer bracket 11 are press-fitted or shrinkage-fitted into the frame unit 200 after integration by molding (subassembly formation), assembly is easier than when the parts of the stator unit 70 are installed separately.

In addition, because connection between the leader lines 21 of the windings 7 and the connector 80 can be performed before installing the stator unit 70 in the frame unit 200, the connecting operation is facilitated.

Furthermore, in the conventional intelligent motor that is disclosed in Patent Literature 1, because connection between the servomotor and the driving unit is performed at positions that are deep inside the housing using connecting cables, connection is extremely difficult. In contrast to that, in the mechanically and electrically integrated driving apparatus according to Embodiment 1, because the connecting operation between the leader lines 21 and the connector 80 can be performed outside the frame unit 200, not only soldering or brazing, but also joining using welding, which requires space, becomes possible.

Because the connecting terminals 23 that protrude toward the inverter unit 400 from an upper portion of the outer bracket 11 are connected to the output terminals 24 of the power modules 14, the connecting operation is comparatively easier, even if inside the frame unit 200, enabling electrical connection between the inverter unit 400 and the motor unit 300 to be performed simply.

Because there is no joint on the frame unit 200, there is no need for concern that the liquid coolant may leaks through a joint.

In addition, because the frame unit 200 is integrated without being divided axially, the overall rigidity of the driving apparatus is high.

Furthermore, because the frame unit 200 is divided into the outer frame 1a and the inner frame 1b, it is easy to produce when manufacturing by cutting and casting.

By partitioning the motor unit 300 and the inverter unit 400 using a series of parts that includes the outer bracket 11, heat and electromagnetic noise from the motor unit 300 are less likely to propagate to the inverter unit 400. At the same time, heat and electromagnetic noise from the inverter unit 400 are less likely to propagate to the motor unit 300.

In addition, rubbish that is generated in the motor unit 300 can be prevented from entering the inverter unit 400. At the same time, rubbish and parts from the inverter unit 400 can be prevented from entering and being caught on the motor unit 300.

Because the first bearing 10a is held by the inner bracket 12, it is not necessary to dispose parts that hold the first bearing 10a separately, enabling the number of parts to be reduced.

Because heat from the first bearing 10a is radiated to the frame unit 200 by means of the inner bracket 12 and the outer bracket 11, the bearing 10a can be prevented from reaching high temperatures.

In addition, because precision machining of a portion that interfits with the bearing 10a is made possible by making the inner bracket 12a separate part from the frame unit 200, the first bearing 10a that supports the output shaft 4 can be fitted together and held precisely.

By making the inner bracket 12a separate part from the outer bracket 11, the first bearing 10a is fitted onto the output shaft 4 after the rotor unit 60 is inserted into the stator unit 70, and can be held by the inner bracket 12. Assembly and disassembly of the rotor unit 60 can thereby be performed simply. In addition, because the inner bracket 12 can be removed, internal cleaning after molding, removing rubbish that is generated inside the motor unit 300, and internal inspections can be performed easily.

Because the stator core 6, the windings 7, and the outer bracket 11 are molded in a resin material 13, heat that is generated by the windings 7 is transferred to the inner frame 1b by means of the stator core 6 and the outer bracket 11, and is actively cooled by the liquid coolant that flows through the motor-side coolant flow channels 18b. Because of that, temperature increases in the windings 7 can be suppressed.

In addition, because the leader lines 21 of the windings 7 are also molded as a portion of the stator unit 70, heat from the leader lines 21 can be released to the frame unit 200, also enabling the leader lines 21 to be cooled efficiently.

In the inverter unit 400, on the other hand, because the radiating surfaces 14a of the power modules 14 are placed in close contact with the inner walls of the inner frame 1b, the power modules 14 are actively cooled by the liquid coolant that flows through the inverter-side coolant flow channels 18a.

Furthermore, because the leader line insertion apertures 20 for passage of the leader lines 21 of the windings 7 are disposed on the outer bracket 11, it becomes possible to lead the leader lines 21 out from the motor unit 300 without passing through the coolant flow channels 18 of the frame unit 200, enabling the leakage of the liquid coolant to be prevented.

Because the leader lines 21 are led out outside the motor unit 300, connection to the inverter unit 400 is facilitated.

In addition, because connections from the windings 7 to the power modules 14 are performed without using wires, connection is not complicated, enabling the windings 7 and the power modules 14 to be connected more reliably, thereby increasing reliability of electrical connections.

Furthermore, in FIG. 6, outside diameter dimensions of the outer bracket 11 are larger than outside diameter dimensions of the stator core 6, and the outer circumference of the outer bracket 11 is configured so as to be fitted closely around the inner circumference of the frame unit 200. Thus, by making the outside diameter dimensions of the outer bracket 11 larger than the outside diameter dimensions of the stator core 6, the stator core 6 will not get caught and be difficult to insert when inserting the stator unit 70 into the frame unit 200.

Because an outside diameter dimension of the stator core 6 is smaller than an outside diameter dimension of the outer bracket 11, and the stator core 6 is inserted into the frame unit 200 so as to leave a gap, precision of the outside diameter dimension of the stator core 6 can be reduced compared to when the stator core 6 is press-fitted into the frame unit 200. Tolerance management is thereby facilitated, enabling reductions in cost to be achieved.

Moreover, in the relationship between the outside diameter dimension of the outer bracket 11 and the outside diameter dimension of the stator core 6, the outside diameter dimension at the smallest tolerance of the outer bracket 11 need only be larger than the outside diameter dimension at the maximum tolerance of the stator core 6, and may be approximately equal in appearance. In that case, the stator core 6 will need to be lightly press-fitted into the frame unit 200, but because the outside diameter dimension of the stator core 6 is still smaller than the outside diameter dimension of the outer bracket, the stator core 6 will not get caught and be difficult to insert.

If a material that has higher thermal conductivity and lower specific gravity than the ferrous material such as electromagnetic steel sheets that are commonly used as the material for the stator core 6 is used as a material for the outer bracket 11 and the inner bracket 12, such as an aluminum alloy or a magnesium alloy, for example, then it will be possible to convey heat from the motor unit 300 to the frame unit 200 effectively. In addition, because the weight of the outer bracket 11 and the inner bracket 12 is lighter, overall weight reductions can also be achieved.

In addition, because the radiating fins 27a and 27b are not disposed throughout the coolant flow channel 18, flow channel resistance due to the radiating fins 27a and 27b will not be increased significantly.

Furthermore, because the connecting positions can be offset circumferentially by the connecting conductors 22a through 22f from the outlet positions of the leader lines 21a through 21l from the windings 7a through 7l to the positions at which the power modules 14 are disposed, the connections are not complicated and will not lead to mistakes.

Because the twelve leader lines 21a through 21l from the windings 7a through 7f are gathered together into six using the connecting conductors 22a through 22f, and then connected to the power modules 14 using the connecting terminals 23a through 23f, it is possible to reduce the number of connecting parts to half.

In addition, because the connecting conductors 22a through 22f of the connector 80 are bent and folded so as not to interfere with each other, grooves in the connecting base 29 are reduced to five, where seven were originally required, enabling area that the connector 80 occupies to be reduced.

Embodiment 2

Figure 20:
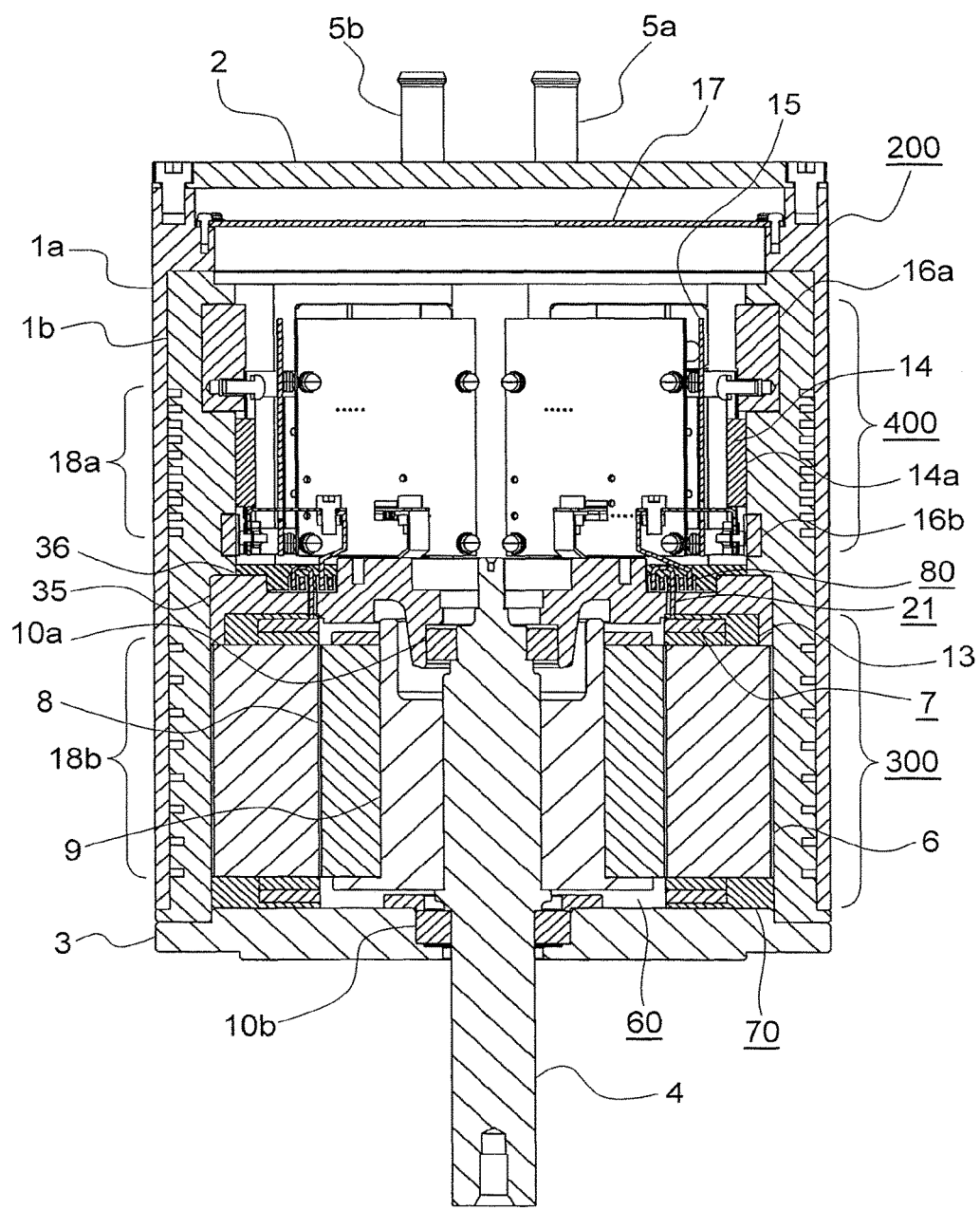
FIG. 20 is a cross section that is taken parallel to a shaft axis of the mechanically and electrically integrated driving apparatus according to Embodiment 2 of the present invention.
Figure 21:
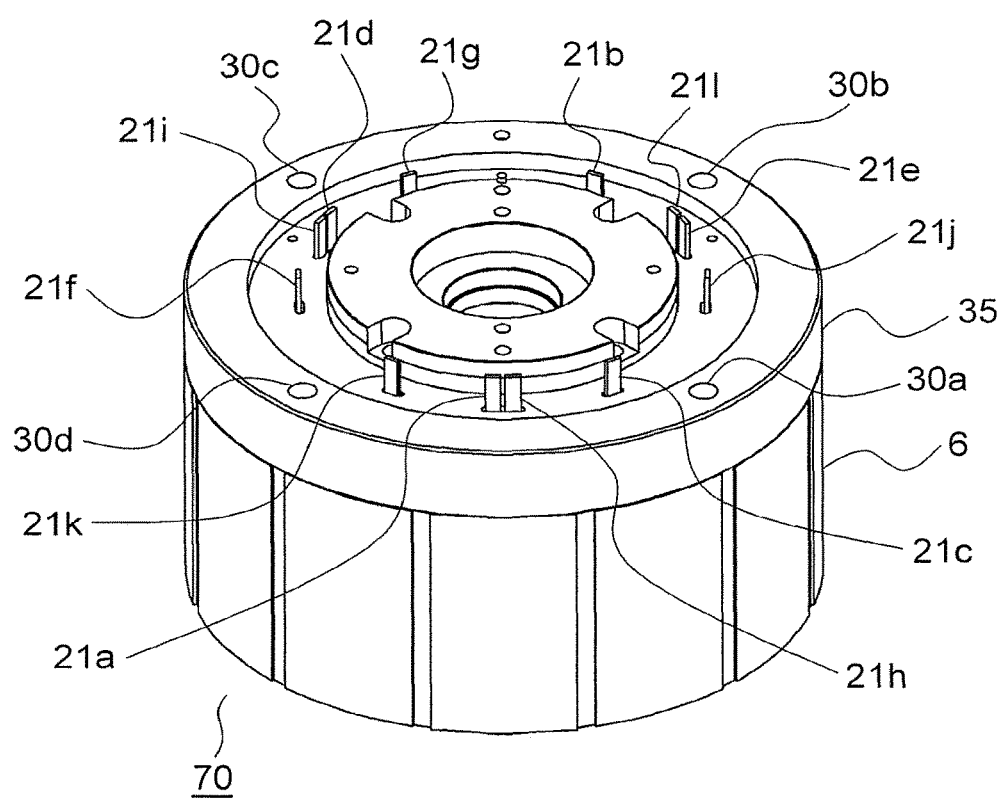
FIG. 21 is an oblique projection that shows a state of a stator unit from FIG. 20 before molding.

Next, FIG. 20 is a cross section that is taken parallel to a shaft axis of the mechanically and electrically integrated driving apparatus according to Embodiment 2 of the present invention, and FIG. 21 is an oblique projection that shows a state of a stator unit 70 from FIG. 20 before molding. In Embodiment 2, a bracket 35 is used that integrates the outer bracket 11 and the inner bracket 12 that are shown in Embodiment 1.

In Embodiment 2, an outside diameter dimension of a stator core 6 is larger than an outside diameter dimension of the bracket 35, and an outer circumference of the stator core 6 is configured so as to fit closely around an inner circumference of a frame unit 200.

In addition, in Embodiment 2, connecting conductors 22, a connecting base 29, and leader lines 21 are molded by a resin material 36, as shown in FIG. 20. The rest of the configuration and operation are similar or identical to those of Embodiment 1.

Figure 22:
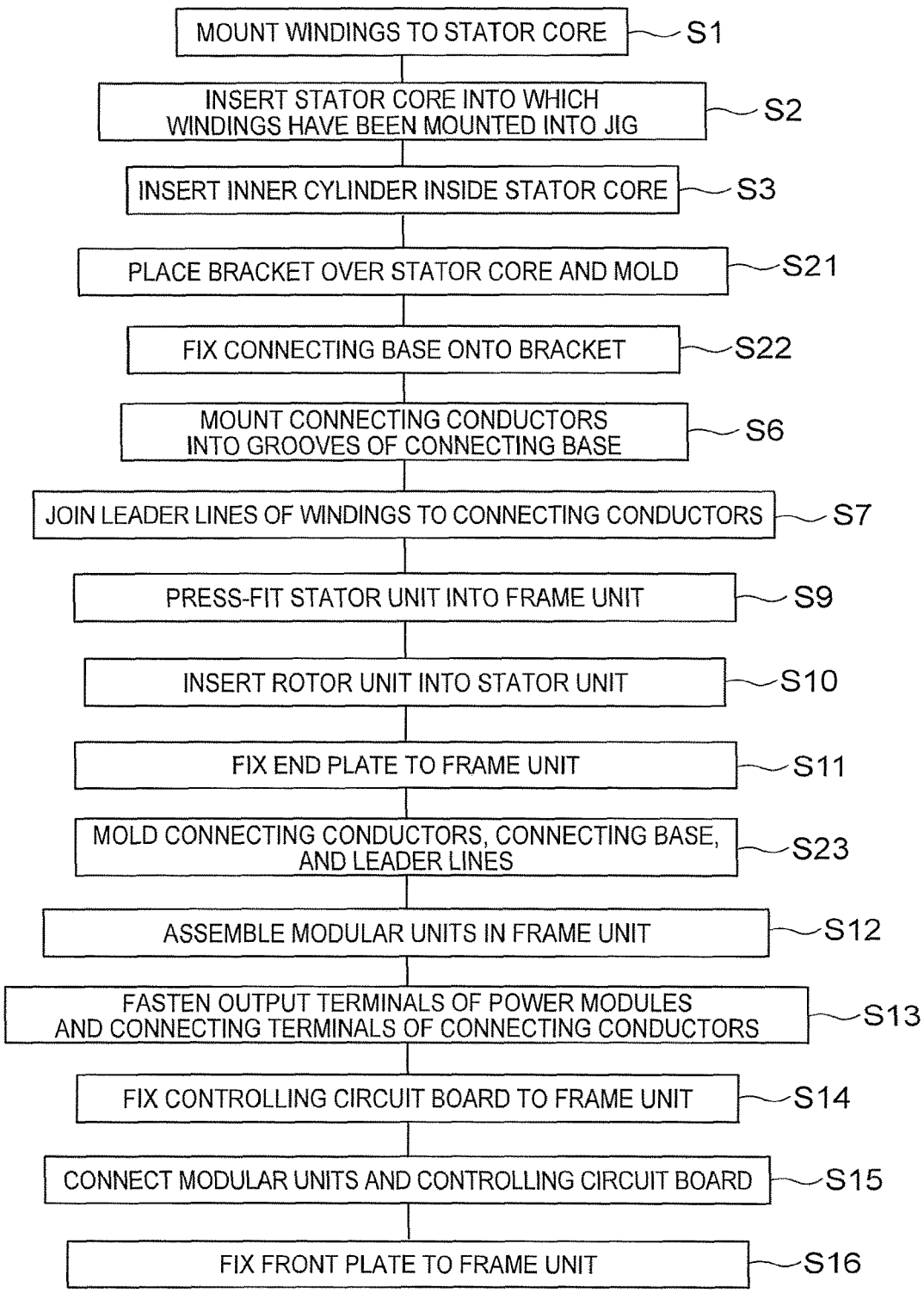
FIG. 22 is a flowchart that shows a manufacturing method for the mechanically and electrically integrated driving apparatus in FIG. 20.

Next, a method for manufacturing the mechanically and electrically integrated driving apparatus according to Embodiment 2 will be explained. FIG. 22 is a flowchart that shows a manufacturing method for the mechanically and electrically integrated driving apparatus in FIG. 20. Differences from FIG. 17, which showed a method for manufacturing in Embodiment 1, are that "outer bracket" has changed to "bracket" (Steps S21 and S22), that the step "mount inner bracket to outer bracket" in Step S8 in FIG. 17 has been deleted, and that "mold connector, connecting base, and leader lines" has been added as Step S23 in FIG. 22, and the rest of the manufacturing method is similar or identical to that of Embodiment 1.

In a mechanically and electrically integrated driving apparatus of this kind, because the integrated bracket 35 is used, it becomes difficult to fit the output shaft 4 together with the first bearing 10a because the first bearing 10a must first be mounted to the bracket 35 during assembly of the rotor unit 60. Removal of rubbish generated inside the motor unit 300 and internal inspections also become impossible because the bracket 35 cannot be removed after the stator unit 70 is press-fitted in the frame unit 200. However, other effects are similar or identical to the effects that were described in Embodiment 1.

Because the integrated bracket 35 is used, the number of parts is reduced, enabling reductions in cost to be achieved.

In addition, since the rigidity of the bracket 35 itself is increased, the rotor unit 60 can be held more reliably, enabling vibration and noise to be reduced, and also enabling reliability to be improved.

Because there are no joints on the bracket 35, heat from the motor unit 300 can be transferred to the frame unit 200 efficiently.

Because the stator core 6 is fitted into the frame unit 200 without leaving gaps, the axial mating length can be increased compared to when the bracket 35 is fitted into the frame unit 200, and the stator core 6 will not be dislodged or rotated even if torque acts thereon during driving.

In addition, because the stator core 6 is fitted into the frame unit 200 without leaving gaps, heat that the windings 7 generate can transfer to the frame unit 200 through the stator core 6, which has greater contact area, enabling temperature increases in the windings 7 to be suppressed more effectively.

Furthermore, because the connecting conductors 22, the connecting base 29, and the leader lines 21 are molded in a resin material 36, the connecting conductors 22 are integrated with the connecting base 29, and the connector 80 is held firmly, preventing misalignment of the connector 80.

By integrating the connecting base 29 and the leader lines 21 in a molding, heat that is transferred from the windings 7 through the leader lines 21 to the connector 80, and is conducted to the bracket 35 and the frame unit 200 efficiently, enabling the windings 7 to be cooled efficiently.

In addition, because the connecting conductors 22 and the leader lines 21 are not exposed at a surface owing to the molding, these will not short-circuit due to metal fragments coming into contact therewith, nor will rubbish adhere thereto.

Furthermore, when installing the inverter unit 400, parts and tools can be prevented from contacting and damaging coatings and conductor surfaces of the connecting conductors 22 and the leader lines 21.

Embodiment 3

Figure 23:
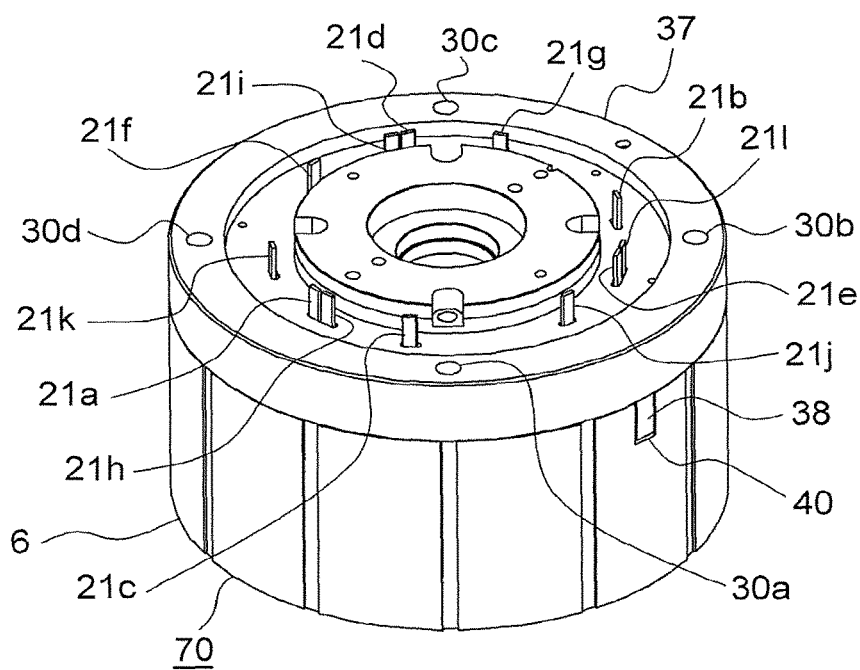
FIG. 23 is an oblique projection that shows a stator unit of a mechanically and electrically integrated driving apparatus according to Embodiment 3 of the present invention.
Figure 24:
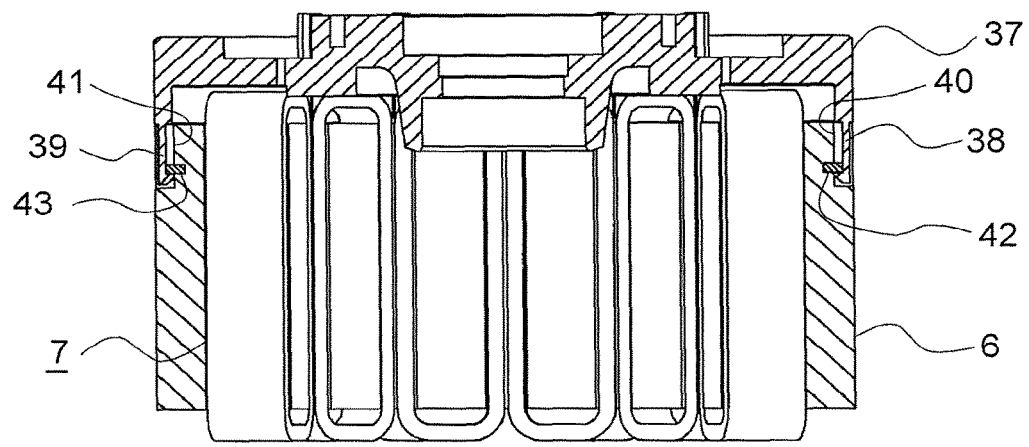
FIG. 24 is a cross section that is taken parallel to a shaft axis of the stator unit in FIG. 23.

Next, FIG. 23 is an oblique projection that shows a stator unit 70 of a mechanically and electrically integrated driving apparatus according to Embodiment 3 of the present invention, and FIG. 24 is a cross section that is taken parallel to a shaft axis of the stator unit 70 in FIG. 23. In Embodiment 3, an integrated bracket 37 is used. First and second projections (hooks) 38 and 39 that protrude toward a stator core 6 are disposed on end portions of outer circumferential portions of the bracket 37 that are near the stator core 6. The first and second projections 38 and 39 are disposed so as to be offset by 180 degrees in a circumferential direction of the bracket 37 so as to face each other.

A first projection insertion groove 40 into which the first projection 38 is inserted, and a second projection insertion groove 41 into which the second projection 39 is inserted, are disposed on an outer circumference of the stator core 6. A first pin 42 with which a tip end portion of the first projection 38 engages is fixed by being press-fitted in a radial direction inside the first projection insertion groove 40. A second pin 43 with which a tip end portion of the second projection 39 engages is fixed by being press-fitted in a radial direction inside the second projection insertion groove 41. The first and second pins 42 and 43 protrude outward in a radial direction of the stator core 6.

Figure 25:
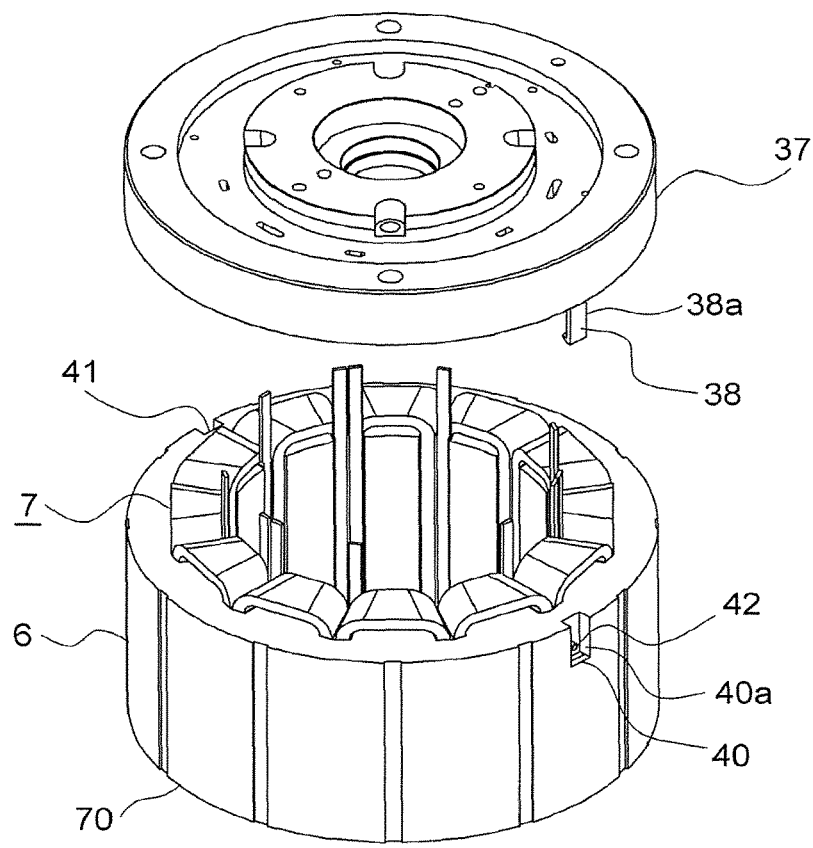
FIG. 25 is an exploded oblique projection that shows a state in which a bracket from FIG. 23 is removed from the stator unit.
Figure 26:
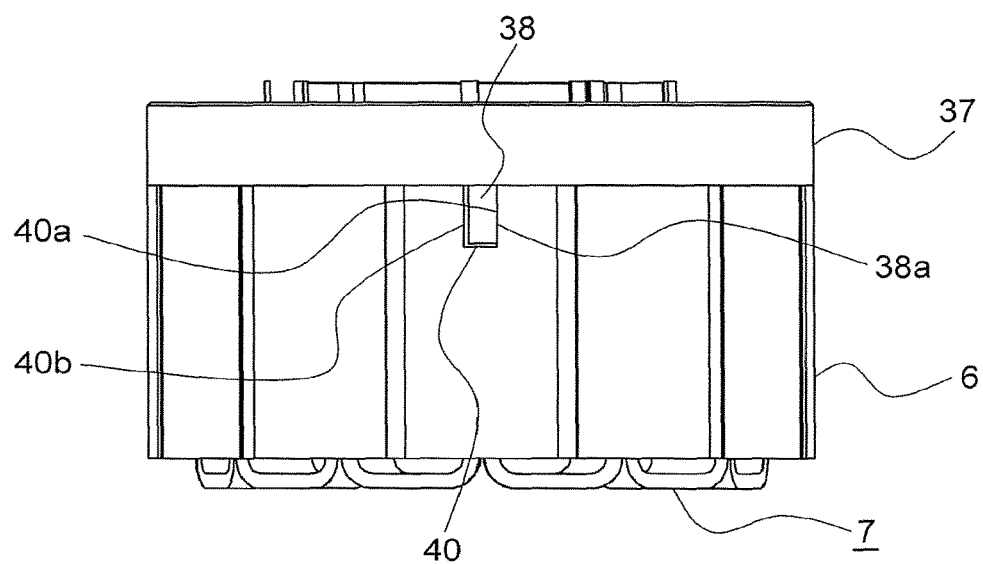
FIG. 26 is a side elevation that shows the stator unit from FIG. 23.
Figure 27:
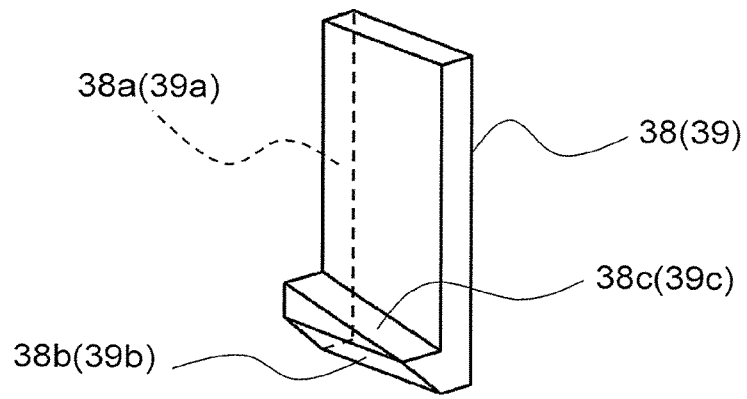
FIG. 27 is an oblique projection that shows a shape of a first projection from FIG. 24 in detail.
Figure 28:
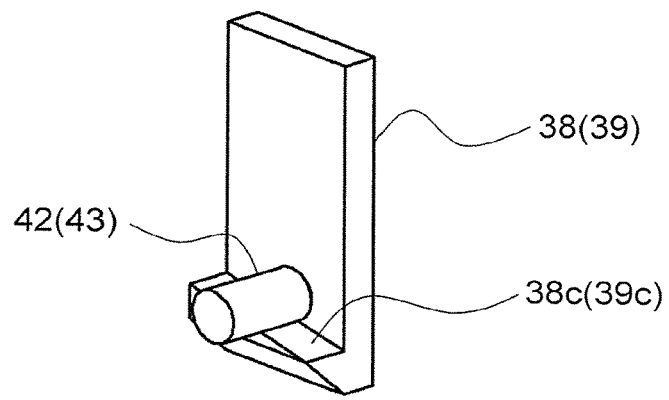
FIG. 28 is an oblique projection that shows a state when the first projection in FIG. 27 is engaged with a first pin.
Figure 29:
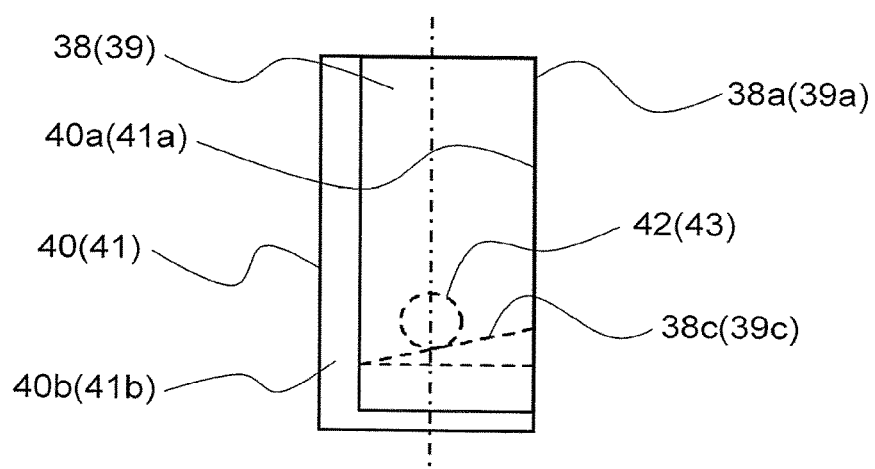
FIG. 29 is a front elevation that shows relationships among the first projection in FIG. 27, a first groove, and the first pin.

FIG. 25 is an exploded oblique projection that shows a state in which the bracket 37 from FIG. 23 is removed from the stator unit 70, FIG. 26 is a side elevation that shows the stator unit 70 from FIG. 23, FIG. 27 is an oblique projection that shows a shape of the first projection 38 from FIG. 24 in detail, FIG. 28 is an oblique projection that shows a state when the first projection 38 in FIG. 27 is engaged with the first pin 42, and FIG. 29 is a front elevation that shows relationships among the first projection 38 in FIG. 27, the first projection insertion groove 40, and the first pin 42. Moreover, a shape of the second projection 39, and relationships among the second projection 39, the second projection insertion groove 41, and the second pin 43 are similar or identical to those in FIGS. 27 through 29.

In FIG. 27, a claw portion is disposed on a tip end of the first projection 38 (and of the second projection 39), and an axially tapered portion 38*b* (39*b*) that has an incline in an axial direction of the bracket 37 and a circumferentially tapered portion 38*c* (39*c*) that has an incline in a circumferential direction are disposed on the claw portion.

A side surface of the circumferentially tapered portion 38*c* (39*c*) of the first projection 38 (the second projection 39) where the taper is higher constitutes a circumferential positioning surface 38*a* (39*a*) that performs positioning of the bracket 37 in the circumferential direction.

From the state that is shown in FIG. 25, the first and second projections 38 and 39 are inserted into the first and second projection insertion grooves 40 and 41, respectively, when the bracket 37 is placed over the stator core 6. If the bracket 37 is pushed in strongly, the axially tapered portions 38*b* and 39*b* that are disposed on the tip ends of the first and second projections 38 and 39 ride over the tip ends of the first and second pins 42 and 43, and as shown in FIG. 28, the circumferentially tapered portions 38*c* and 39*c* of the first and second projections 38 and 39 engage with the outer circumferential surfaces of the first and second pins 42 and 43 and enter the state in FIG. 26.

Here, as shown in FIG. 29, because the circumferentially tapered portions 38*c* and 39*c* are pressed to the right by the first and second pins 42 and 43, the circumferential positioning surfaces 38*a* and 39*a* of the first and second projections 38 and 39 are placed in contact with the first and second projection insertion grooves 40 and 41 and come into contact with the surfaces 40*a* and 41*a*, and circumferential positioning of the bracket 37 and the stator core 6 is performed.

There is a first clearance 40*b* between the first projection 38 and the first projection insertion groove 40, and there is a second clearance 41*b* between the second projection 39 and the second projection insertion groove 41. Because the bracket 37 is pulled in the direction of the stator core 6 by the first and second projections 38 and 39 engaging with the first and second pins 42 and 43, respectively, a lower end surface of the bracket 37 is pressed against an upper surface of the stator core 6, also performing axial positioning of the bracket 37 and the stator core 6.

Moreover, chamfering or rounding may be applied to the tip ends of the first and second pins 42 and 43 such that the axially tapered portions 38*b* and 39*b* of the first and second projections 38 and 39 can ride over easily. The rest of the configuration and operation are similar or identical to those of Embodiment 2.

Next, a method for manufacturing the mechanically and electrically integrated driving apparatus according to Embodiment 3 will be explained. If the connecting conductors 22 are molded in a resin material 36 in a similar manner to that of Embodiment 2, then the method for manufacturing the mechanically and electrically integrated driving apparatus according to Embodiment 3 is almost identical to the method for manufacturing that is shown in FIG. 22. The difference from Embodiment 2 is that it is necessary to dispose grooves that allow the first and second projections 38 and 39 to slide on the inner wall surface of the outer cylinder 31 of the molding jig that is shown in FIG. 18, because the first and second projections 38 and 39 ride over the respective first and second pins 42 and 43, and widen outward slightly when the bracket 37 is placed over the stator core 6. Because the rest of the method for manufacturing is similar or identical to Embodiment 2, similar effects to those due to the method for manufacturing that is describe in Embodiment 2 can be achieved.

In the mechanically and electrically integrated driving apparatus according to Embodiment 3, circumferential direction and axial positioning between the bracket 37 and the stator core 6 can be performed simply by pressing the bracket 37 into the stator core 6 in the above manner. Because the first and second projections 38 and 39 engage the first and second pins 42 and 43, respectively, fixing of the bracket 37 to the stator core 6 can also be performed simultaneously. The rest of the effects are similar or identical to the effects of the mechanically and electrically integrated driving apparatus that is shown in Embodiment 2.

Moreover, application of the mechanically and electrically integrated driving apparatus according to the present invention is not limited to electric vehicles or hybrid vehicles.

The invention claimed is:

1. A mechanically and electrically integrated driving apparatus comprising:
   a cylindrical frame unit;
   a motor unit that comprises:
      a stator core;
      a plurality of windings that are mounted to the stator core; and
      a rotor unit that is inserted into the stator core,
   the motor unit being housed in the frame unit; and
   an inverter unit that comprises:
      power modules that supply electric power to the motor unit; and
      a power module driving circuit board that drives the power modules, the inverter unit being housed in the frame unit,
   wherein:
   a common coolant flow channel for cooling the motor unit and the inverter unit is disposed inside a wall portion of the frame unit;
   the power modules are placed in close contact with an inner wall surface of the frame unit;
   a bracket that is separate from the frame unit is fitted into the frame unit;
   a space inside the frame unit is divided by the bracket into:
      a space in which the motor unit is housed; and
      a space in which the inverter unit is housed;
   a connector for connecting the power modules and the windings is disposed on an end portion of the bracket that is near the inverter unit;
   the connector includes a plurality of connecting conductors to which the leader lines from the windings are connected;
   connecting terminals that rise up at positions at which the power modules are disposed are disposed on each of the connecting conductors;
   a bearing that rotatably holds a shaft of the rotor unit is held on the bracket;
   the bracket comprises:
      a discoid outer bracket; and
      an inner bracket;
   a recess portion is disposed on an end portion of the outer bracket that faces the inverter unit;
   the inner bracket is fitted into the recess portion;
   the bearing is held on the inner bracket; and
   the connector is disposed on the end portion of the outer bracket on which the recess portion is disposed.

2. The mechanically and electrically integrated driving apparatus according to claim 1, wherein:
   a projection that protrudes toward the stator core is disposed on an end portion of the bracket that is near the stator core;
   a claw portion is disposed on a tip end of the projection;
   an axially tapered portion that has an incline in an axial direction of the bracket and a circumferentially tapered portion that has an incline in a circumferential direction are disposed on the claw portion;
   a groove into which the projection is inserted is disposed on an outer circumference of the stator core;
   a pin that protrudes outward in a radial direction of the stator core is disposed on the groove; and
   the circumferentially tapered portion engages with an outer circumferential surface of the pin.

3. The mechanically and electrically integrated driving apparatus according to claim 1, wherein an outside diameter dimension of the bracket is larger than an outside diameter dimension of the stator core, and an outer circumference of the bracket is fitted closely into an inner circumference of the frame unit.

4. The mechanically and electrically integrated driving apparatus according to claim 1, wherein an outside diameter dimension of the stator core is larger than an outside diameter dimension of the bracket, and an outer circumference of the stator core is fitted closely into an inner circumference of the frame unit.

5. The mechanically and electrically integrated driving apparatus according to claim 1, wherein a material of the bracket is a material that has higher thermal conductivity and lower specific gravity than a ferrous material that constitutes a material of the stator core.

6. The mechanically and electrically integrated driving apparatus according to claim 1, wherein the frame unit has a dual construction that has:
   an outer frame; and
   an inner frame that is mounted inside the outer frame; and
   radiating fins are disposed behind positions on the inner frame with which the power modules are in close contact.

7. The mechanically and electrically integrated driving apparatus according to claim 1, wherein the frame unit has a construction that has no joint in an axial direction.

8. The mechanically and electrically integrated driving apparatus according to claim 1, wherein:
   a plurality of leader line insertion apertures are disposed on the bracket;
   leader lines from the windings pass through the leader line insertion apertures; and
   the stator core, the windings, the leader lines, and the bracket are integrated by molding.

9. The mechanically and electrically integrated driving apparatus according to claim 1, wherein at least one of the circular arc-shaped conductors has a circular arc that has a different radius.

10. The mechanically and electrically integrated driving apparatus according to claim 1, wherein:
    the connecting conductors include plurality of circular arc-shaped conductors that are disposed concentrically; and
    a radius of curvature of at least one of the connecting conductors is modified partway along by folding and bending the at least one of the connecting conductors.

11. The mechanically and electrically integrated driving apparatus according to claim 10, wherein:
    a plurality of leader line insertion apertures are disposed on the bracket;
    leader lines from the windings pass through the leader line insertion apertures; and
    the stator core, the windings, the leader lines, and the bracket are integrated by molding.

12. The mechanically and electrically integrated driving apparatus according to claim 10, wherein:
    a connecting base that is made of an electrically insulating material is fixed to an end portion of the bracket that is near the inverter unit;
    a plurality of grooves are formed on the connecting base; and
    the connecting conductors are inserted into the grooves.

13. The mechanically and electrically integrated driving apparatus according to claim 10, wherein a bearing that rotatably holds a shaft of the rotor unit is held on the bracket.

14. The mechanically and electrically integrated driving apparatus according to claim 10, wherein at least one of the circular arc-shaped conductors has a circular arc that has a different radius.

15. The mechanically and electrically integrated driving apparatus according to claim 12, wherein the connecting conductors, the connecting base, and the leader lines are integrated by molding.

16. A manufacturing method for a mechanically and electrically integrated driving apparatus, the manufacturing method comprising steps of:

placing a bracket over an end portion of a stator core to which a plurality of windings have been mounted, the bracket having a first end portion and a second end portion, the second end portion being closer to the stator core than the first end portion is to the stator core;

integrating the stator core, the windings, and the bracket by molding;

fixing a connecting base that is made of an electrically insulating material on which a plurality of grooves have been formed to the first end portion of the bracket on an opposite side from the stator core;

inserting connecting conductors into the grooves of the connecting base;

fixing an assemblage that includes the stator core, the windings, and the bracket by press-fitting or shrinkage-fitting inside a cylindrical frame unit in which a coolant flow channel is disposed inside a wall portion;

inserting a rotor unit inside the stator core and rotatably holding a shaft of the rotor unit by a bearing; and fixing power modules to the frame unit such that radiating surfaces thereof are placed in close contact with an inner wall surface of the frame unit.

* * * * *